United States Patent [19]

Krygowski

[11] 4,110,830
[45] Aug. 29, 1978

[54] CHANNEL STORAGE ADAPTER

[75] Inventor: Matthew A. Krygowski, Wappingers Falls, N.Y.

[73] Assignee: International Business Machines Corporation, Armonk, N.Y.

[21] Appl. No.: 813,408

[22] Filed: Jul. 5, 1977

[51] Int. Cl.$^2$ ............................. G06F 3/06; H04J 3/00
[52] U.S. Cl. .................................. 364/200; 179/15 A
[58] Field of Search ... 364/200 MS File, 900 MS File; 179/15 A, 15 BA, 15 AT, 18 U

[56] References Cited

U.S. PATENT DOCUMENTS

| 3,623,008 | 11/1971 | Doblmaier et al. | 364/200 |
| 3,792,439 | 2/1974 | Auspurg et al. | 364/200 |
| 3,804,987 | 4/1974 | Cooper | 179/15 A |
| 3,934,232 | 1/1976 | Curley et al. | 364/200 |
| 3,936,803 | 2/1976 | Katzman | 364/200 |
| 4,006,466 | 2/1977 | Patterson et al. | 364/200 |
| 4,012,719 | 3/1977 | Law et al. | 364/200 |
| 4,027,106 | 3/1977 | Belforte et al. | 179/15 AT |
| 4,032,898 | 6/1977 | Grigoletti | 364/200 |

*Primary Examiner*—Mark E. Nusbaum
*Attorney, Agent, or Firm*—Robert Lieber

[57] ABSTRACT

This adapter operates in time division multiplex mode between an input/output channel processing subsystem and a storage access subsystem of a data processing system. The adapter is capable of sustaining multiple processes of information transfer concurrently relative to both subsystems. It is also capable of concurrently sustaining ancillary processes for verifying and timing out individual transactions of the information transfer processes.

6 Claims, 18 Drawing Figures

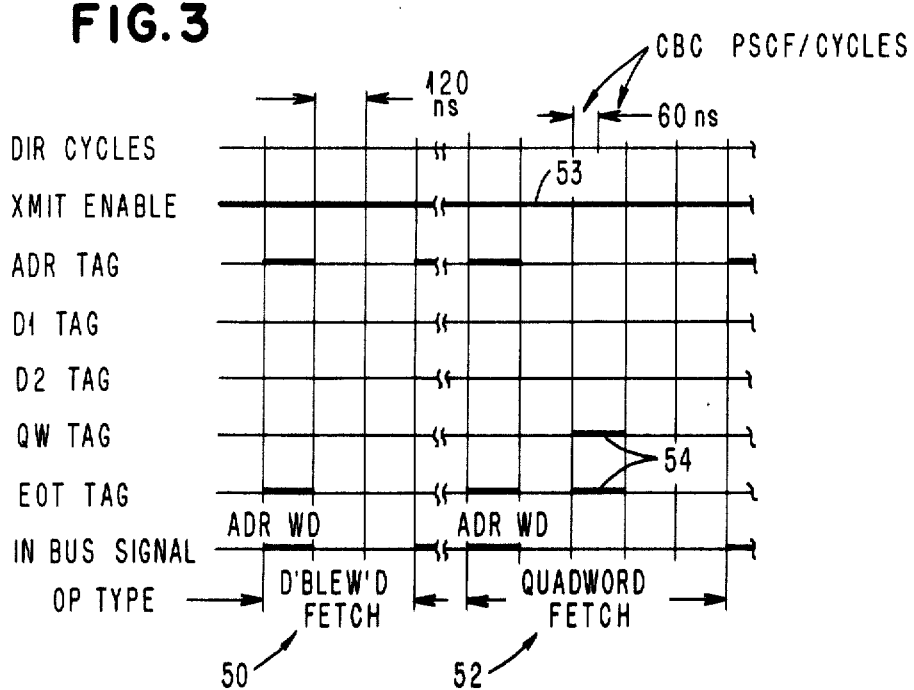
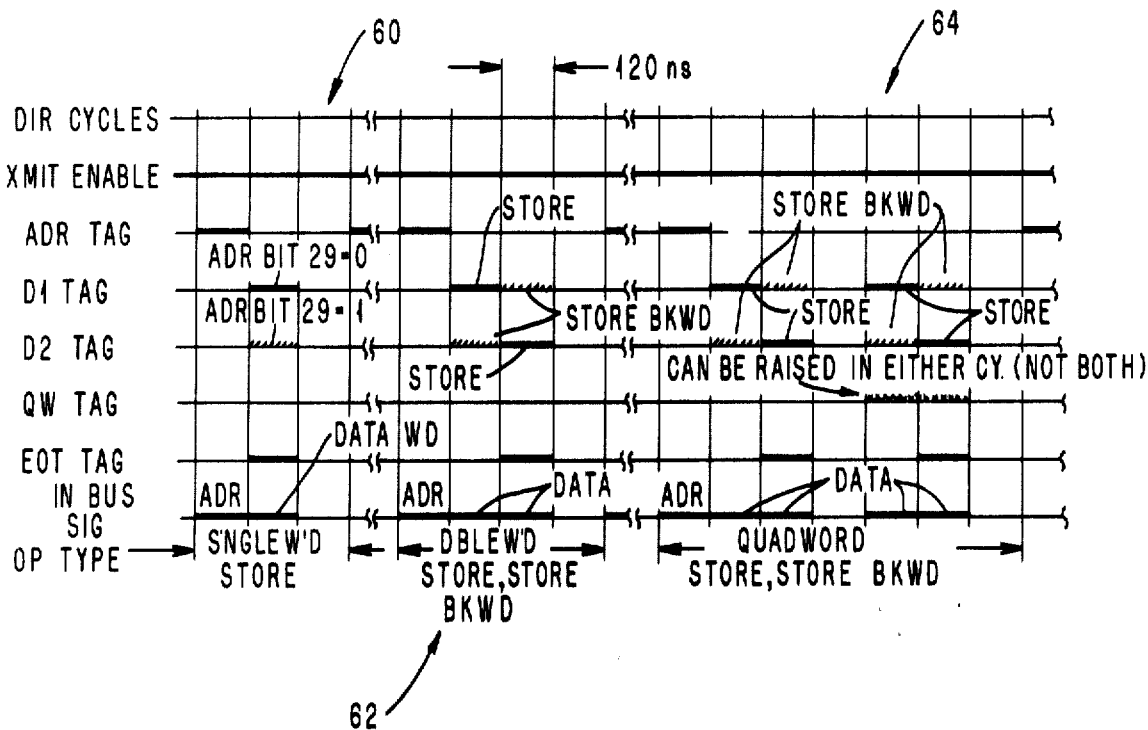

FIG. 5
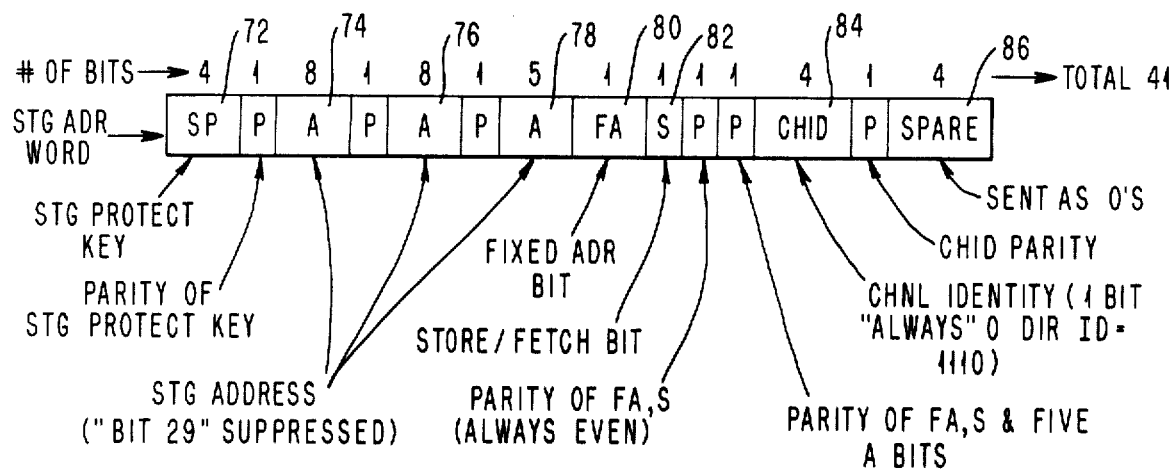
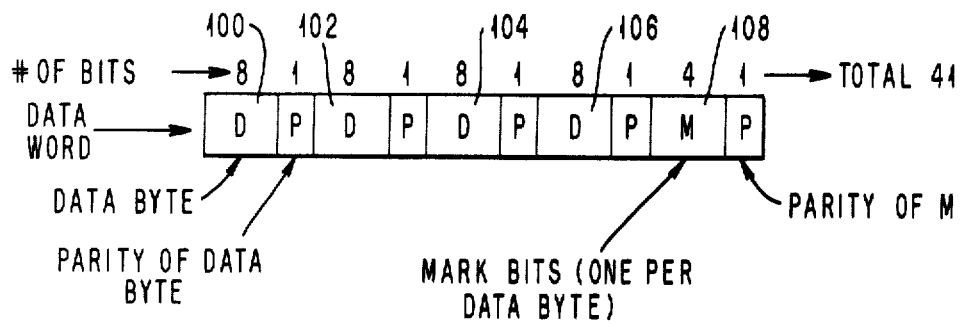
FIG. 6
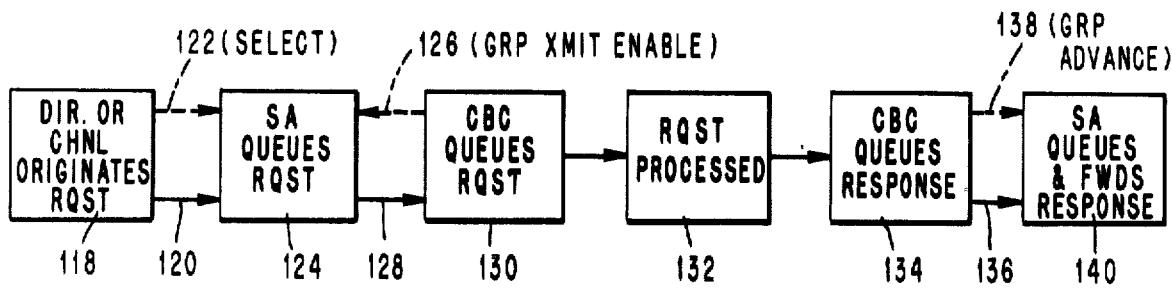

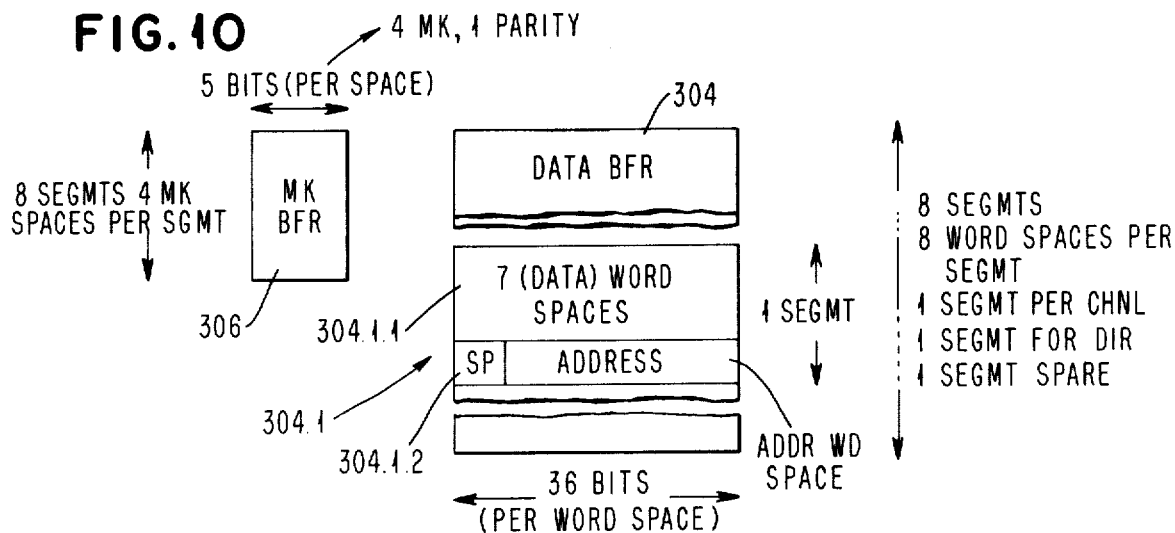
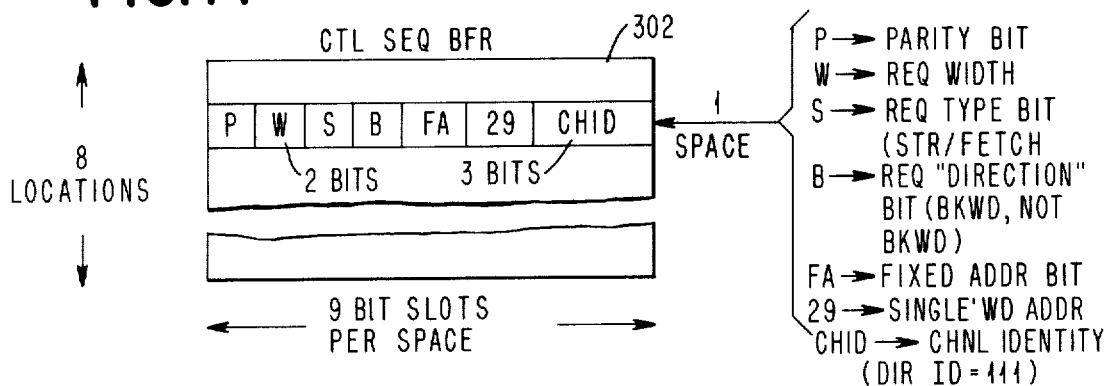
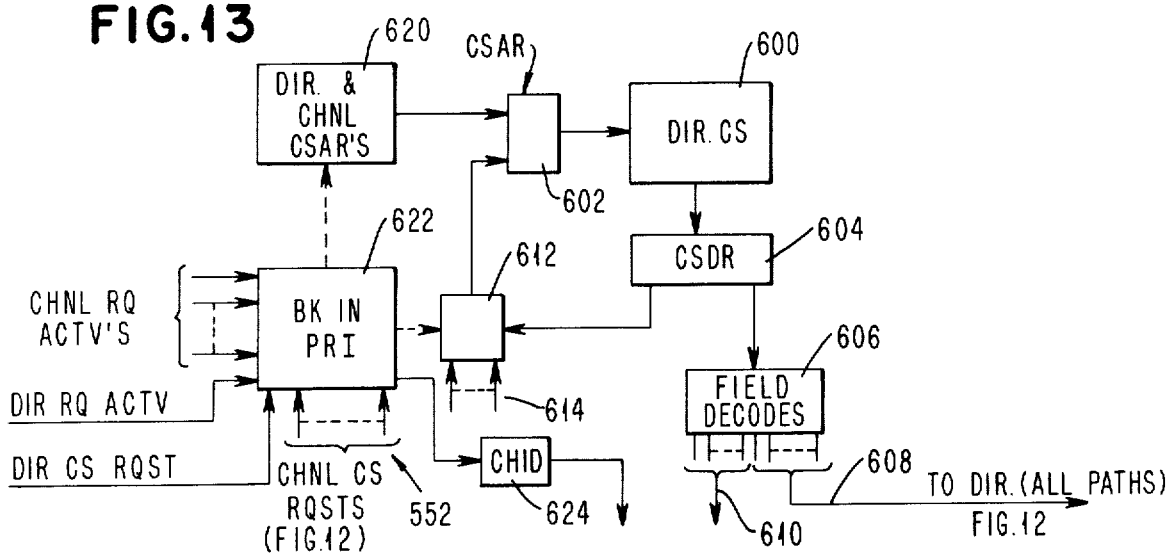

FIG. 14
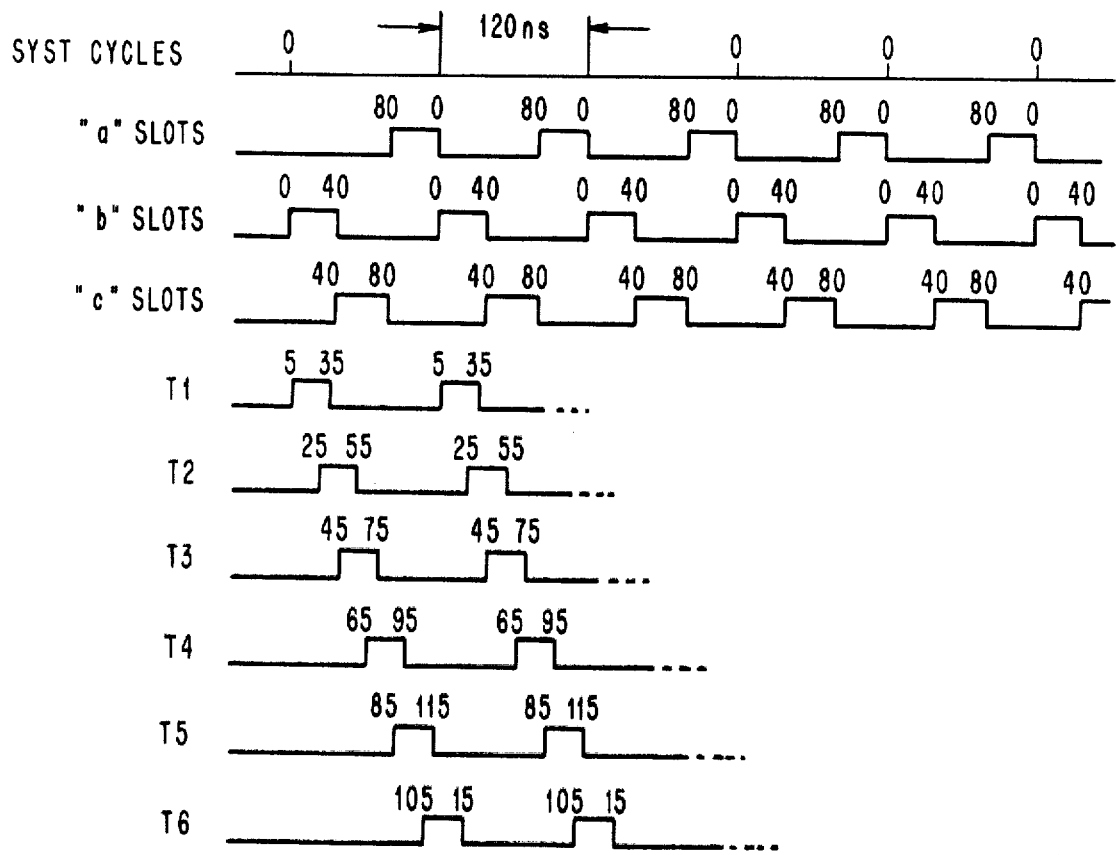
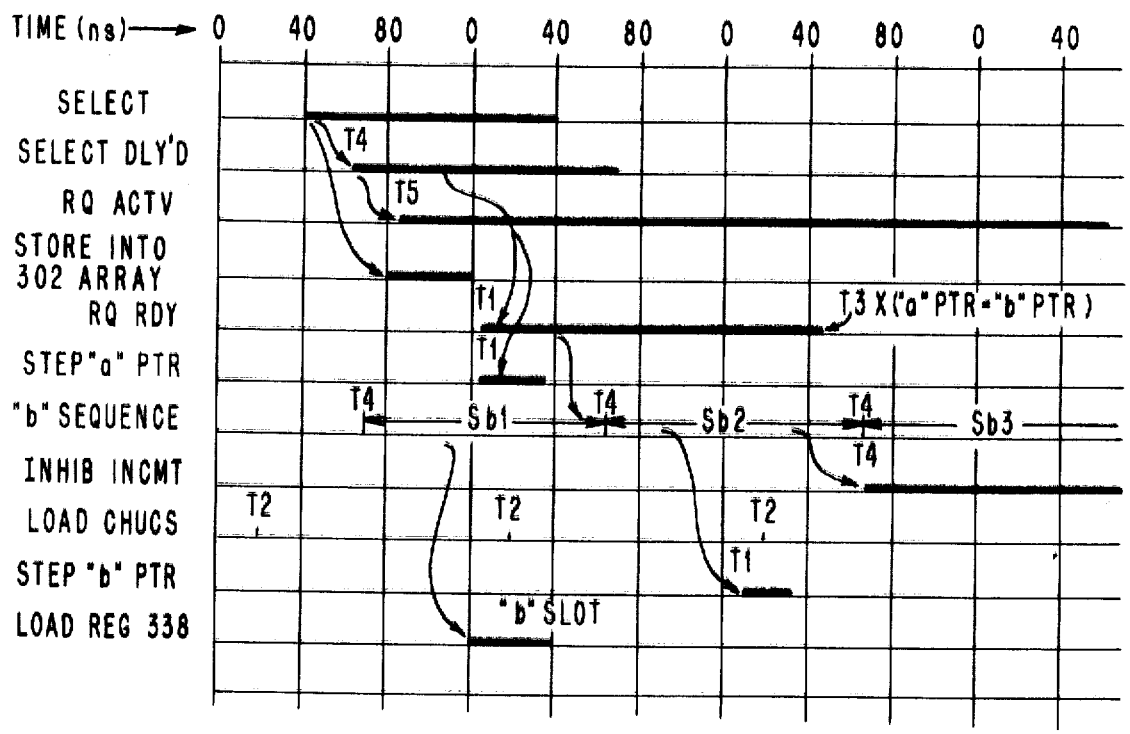

CHANNEL STORAGE ADAPTER

CROSS-REFERENCES TO RELATED PATENTS AND PATENT APPLICATIONS

U.S. patent application Ser. No. 781,895, entitled "Channel Bus Controller," filed Mar. 28, 1977, by R. s. Capowski et al contains a description of a storage access system relative to which the subject adapter is designed to operate.

U.S. patent application Ser. No. 813,404 by R. S. Capowski et al., entitled "Request Forwarding System" and filed simultaneously herewith, contains a description of a request forwarding system formed by the combined usage of the subject adapter and the channel bus controller adaptor (CBC) described in Patent Application Ser. No. 781,895 above.

U.S. Pat. No. 3,585,599, entitled "Universal System Service Adapter," granted June 15, 1971 to D. C. Hitt et al, contains a description — associated with drawing FIGS. 4, 5A–C, 6A–F and 7A–C therein — of a data processor which is employable as the input/output processing system (director) which the subject adapter is designed to augment; said description being incorporated herein by this reference.

BACKGROUND OF THE INVENTION

1. Field of the Invention

The invention relates to adapters for sustaining multiple input/output exchange processes concurrently between plural input/output (I/O) channels and a storage access subsystem of a data processing system.

2. Prior Art

Systems and devices for sustaining multiple data communication processes concurrently, in time division multiplex mode, are generally well known. The present adapter is considered unique in respect to its specific arrangement of timeshared buffer arrays and multiplexed control sequencers for sustaining multiple storage request and response transfer activities concurrently; with a small amount of hardware, with small likelihood of interference (overrun or blocking), and with relatively small burden on (and complexity of) channel controls.

Sharing of controls for storage access by multiple input/output channels is not original as a general proposition. However, the known systems either lack ability to sustain multiple request and response activities concurrently (e.g., the 2846 channel controller feature of the IBM System/360 Model 67) or achieve such ability by providing separate buffer facilities for request and response activities.

The present adapter features time-coordinated sequencers and shared buffer arrays for processing requests and responses concurrently. It also features simple controls for checking associations of requests and responses and for timing out active requests. These ancillary functions are carried out without delaying response handling and without adding a factor of potential unreliability to the handling of requests and responses.

SUMMARY OF THE INVENTION

This adapter sustains multiple request and response transfer activities between input/output and storage access subsystems of a data processing systems. The input/output subsystem presently considered comprises a microprogrammed I/O processor (IOP) shared by multiple I/0 channels; said processor also referred to herein as the director processor. The director and adapter have coextensive cycles of operation.

A first (data) buffer array in the subject adapter is used in a time division mode during individual director/adapter cycles for concurrently passing plural storage access requests and associated storage responses between said IOP and storage access subsystem. Requests originated by the IOP and channels are presented in a quasi-asynchronous mode to the storage access system. Responses produced by the storage access subsystem (data designated by fetch requests and status indications relative to Store/Input requests) are returned to the adapter for quasi-asynchronous return transfer handling relative to the source of the associated request (IOP or channel).

A second (control sequence) buffer array associated with said first array is used in a time division mode to hold control information relative to each active request (a request being active from the time the adapter is primed by a select signal from the IOP to initiate handling of the request until the associated storage response is received by the adapter).

This control information distinguishes: the request type (fetch, store or store backward), the data width of the request (one, two or four data words to be stored, or one, two or four words to be fetched), address information (address bit 29) designating an odd/even choice relative to a pair of word spaces designated by the address part of the request (for one-word transfers), fixed address (FA) information used by the storage access equipment to determine whether a translation is required relative to a particular fixed portion of storage, and request source identity information (denoted CHID for channel identity). Each CHID in the second array is used to address the first buffer array for forwarding the associated request and for receiving the associated response. A representation of the CHID is also included in the forwarded request and a corresponding representation is returned by the storage access subsystem as part of the associated response.

The CHID in the second array is also used as a reference for verifying that the associated request and the actually received response are properly associated. Responses are normally returned to the adapter in the order of transfer of associated requests. In parallel with other operations of response handling the reference CHID in the second array is prepared on an anticipatory basis and compared to the CHID of the actual response while the response is being receptively handled.

Three sequence control systems operate relative to the adapter arrays in discrete time division slots (denoted $a$, $b$ and $c$ slots) in each cycle of director/adapter operation. These slots sustain the transfer processes.

An "$a$" sequencer, which is partially integrated into the microprogram controls of the director processor, operates relative to "$a$" slots to: transfer (enqueue) request intelligence to (in) the adapter arrays (from the director or any channel); initiate request handling by the adapter; transfer response information enqueued in the first array of the adapter (to the director or any channel); and utilize portions of the first array for temporary storage of other intelligence.

A separate "$b$" sequencer operates to have enqueued requests extracted from the adapter arrays in "$b$" slots and controls transfers of said requests to the storage access subsystem.

Another separate "c" sequencer operates to sustain transfers of responses from the storage access subsystem to the adapter and to have said responses entered into said first array in "c" slots. This same sequencer controls ancillary comparison of the response CHID to the CHID of the associated request as mentioned above.

Separate "hang Timer" circuits sustain a timeout process relative to active requests. This process is not dependent on the order of request handling and does not affect normal request handling. It is thereby capable of detecting faulty operation of the system ("hangup"), in respect to the handling of requests and responses without specific interdependencies which could limit the scope of its fault detection utility.

The foregoing and other features, advantages and objectives of the present invention may be more fully understood and appreciated by considering the following detailed description.

DETAILED DESCRIPTION OF THE DRAWINGS

FIG. 1 schematically illustrates the system environment in which the subject adapter is designed to operate;

FIG. 2 illustrates the interface between the subject adapter and the channel bus controller adapter described in the above-referenced U.S. patent application Ser. No. 781,895 by R. S. Capowski et al;

FIGS. 3 and 4 indicate the format and timing of request signals forwarded from the subject adapter to the above-mentioned channel bus controller;

FIG. 5 shows formats of address word and data word signals indicated in FIGS. 3 and 4;

FIG. 6 indicates the general sequence of operation of the system containing the subject adapter in respect to the processing (transfer handling) of storage access requests and associated storage responses;

FIG. 10 illustrates details of the data/mark buffer array in the subject adapter;

FIG. 11 illustrates the control sequence buffer array in said adapter;

FIG. 13 illustrates the director control store and its "a" sequencer relation to the subject adapter;

FIG. 14 illustrates timing in the subject adapter;

Figure 18:
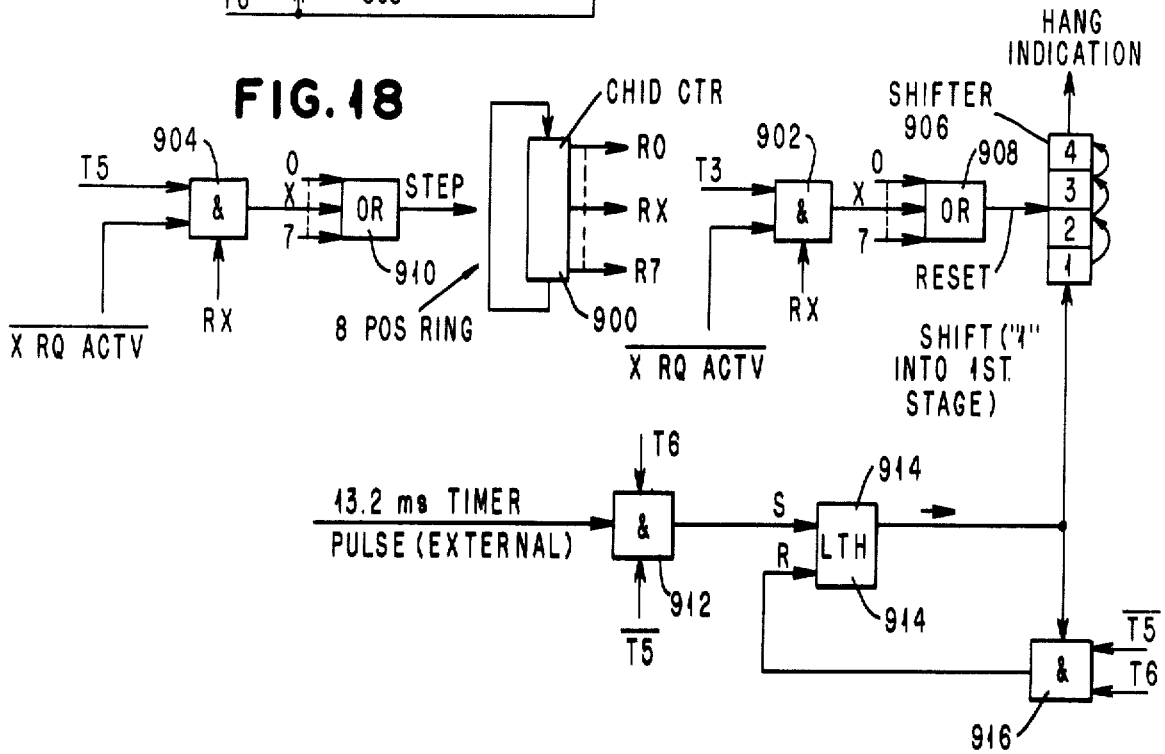
Figure 17:
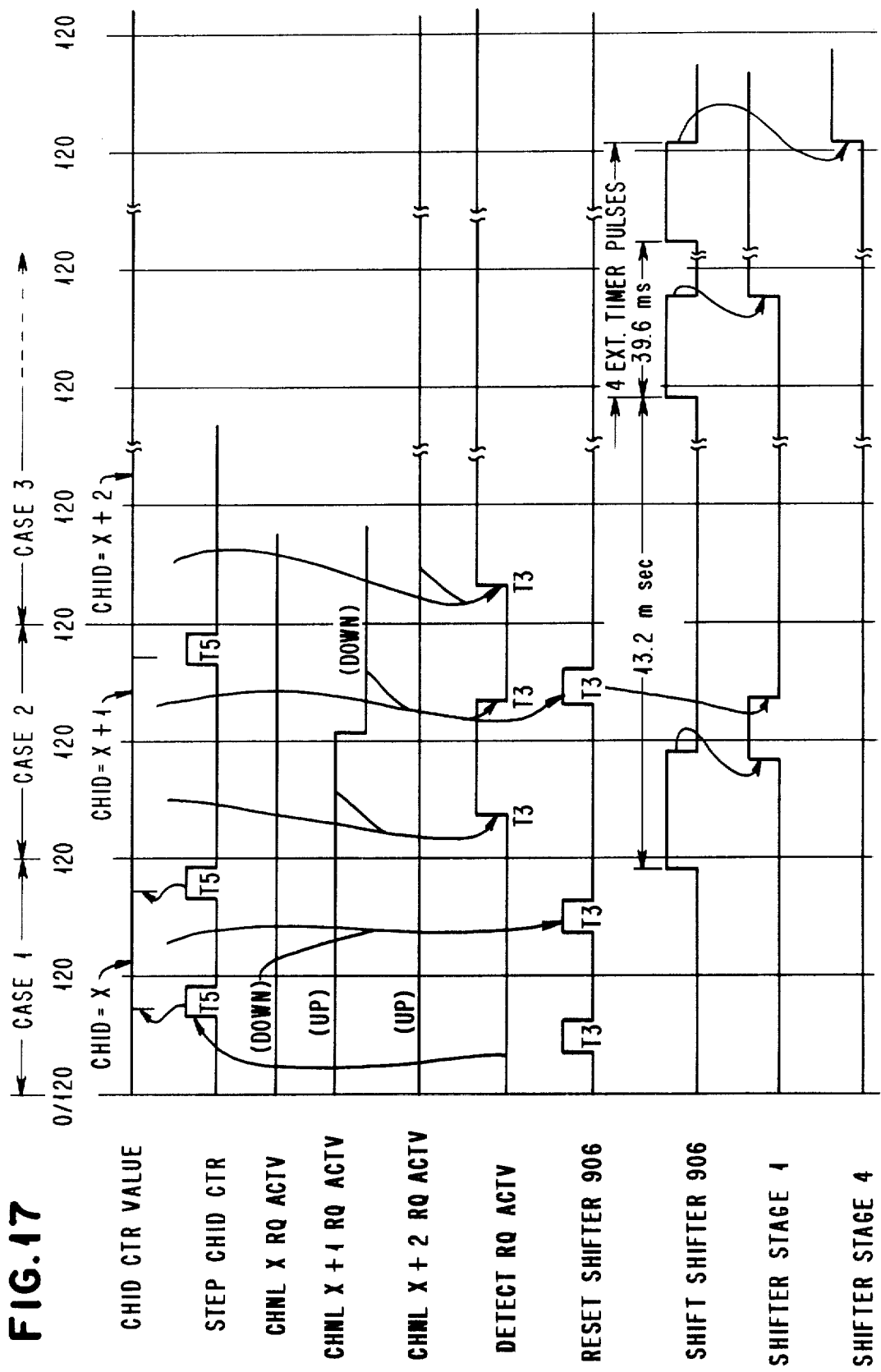

FIGS. 17 and 18 respectively illustrate the operation and logical circuit configuration of the hang detector part of said adapter.

DETAILED DESCRIPTION

Introduction

Figure 1:
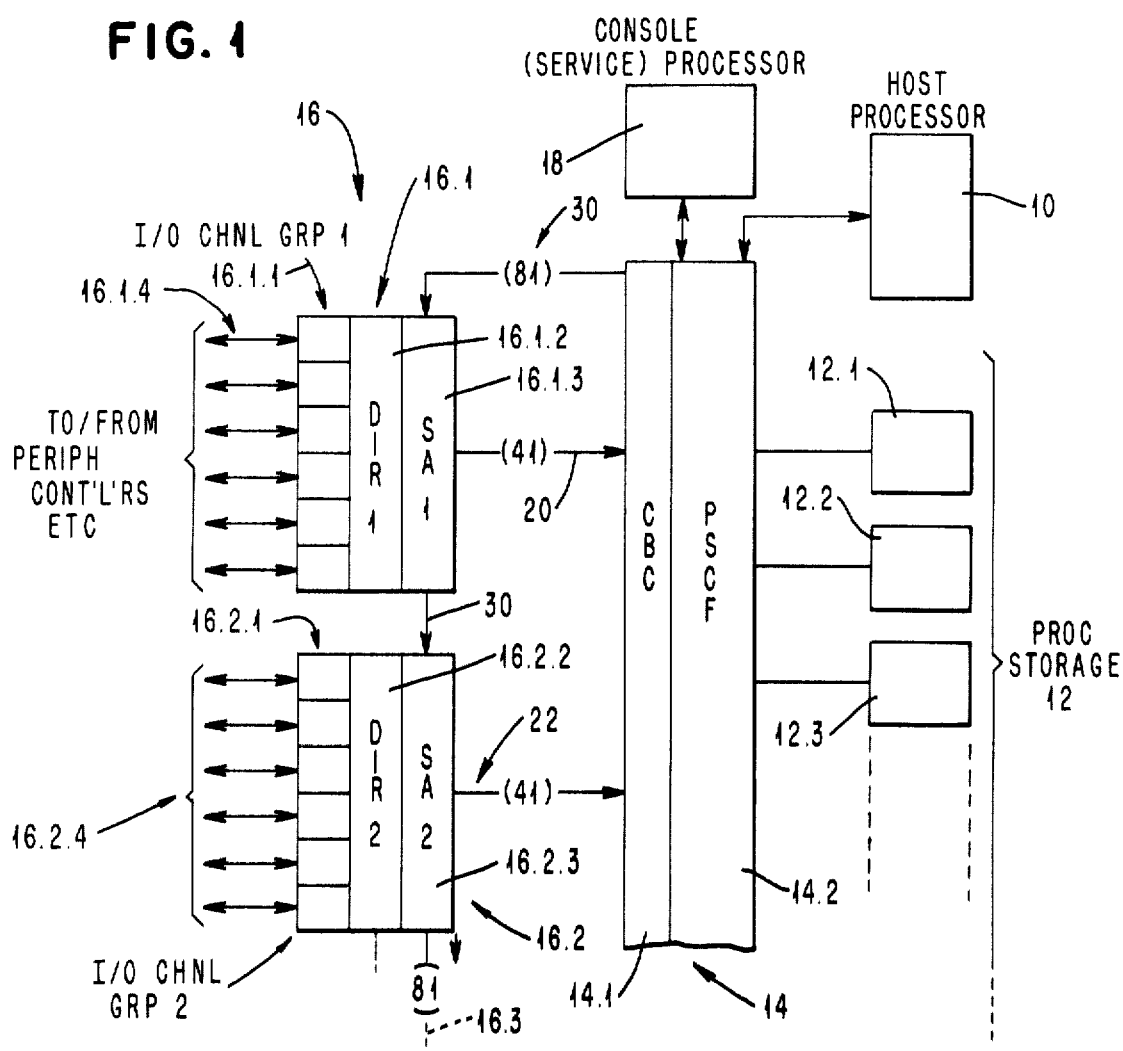
Figure 2:
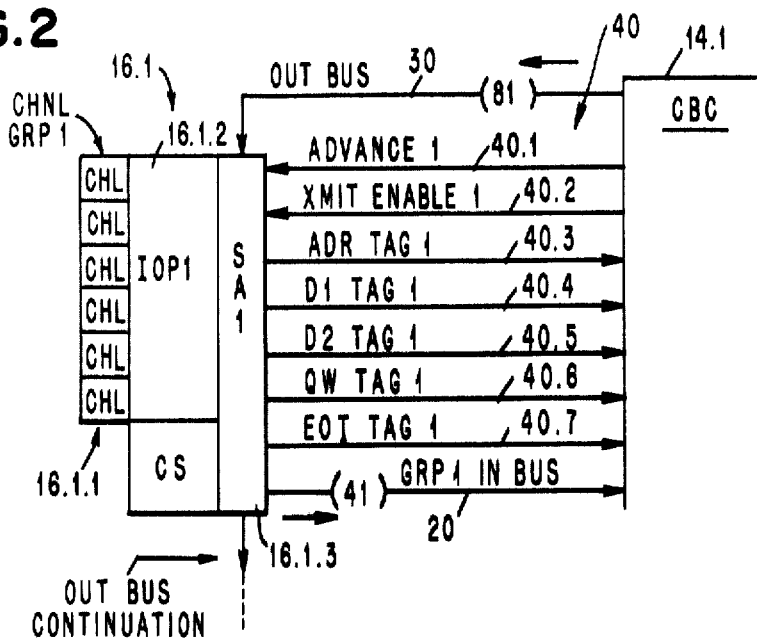

A system incorporating the preferred embodiment of the subject adapter is illustrated in FIGS. 1 and 2. Although details of the individual component blocks of the system, other than the director and subject adapter, are not relevant to an understanding of the subject invention, nevertheless a general description of the operation of said system is given to facilitate an understanding of the environment of operation of this invention.

The environmental system comprises a main host processor 10, a modular storage facility 12, a storage access facility indicated generally at 14, an input/output processing facility indicated generally at 16 (which contains subject adapters) and a console (service) processor facility indicated generally at 18 which provides maintenance support to the system. The storage facility 12 comprises modules 12.1, 12.2, 12.3..., which may be accessible in interleaved mode.

The storage access facility 14 comprises a channel bus controller adapter 14.1 which is the subject of the abovereferenced U.S. patent application Ser. No. 781,895 by R. S. Capowski et al. The adapter 14.1 forms a part of a peripheral storage control facility (PSCF) 14.2 which controls access to store 12. The channel bus controller facility 14.1 provides asynchronous linkage between the I/O processing system 16 and the peripheral storage control facility 14.2. The facility 14.2 serves (is shared by) the channel bus controller 14.1, the host processor 10 and the console processor 18.

The I/O processing system 16 comprises from one to three separate processing subsystems indicated at 16.1, 16.2 and 16.3. Each such subsystem serves a separate group of up to six input/output channels. A group of channels served by the subsystem 16.1 is indicated at 16.1.1. The group of channels served by subsystem 16.2 is indicated at 16.2.1. A subsystem 16.3 and its channels are suggested implicitly by a dotted line.

Each input/output subsystem comprises a microprogram controlled input/output processor (director) which is shared by the respective group of channels and a storage adapter unit which embodies the present invention. Subsystem 16.1 comprises input/output processor 16.1.2 (Director 1) and storage adapter 16.1.3 (SA1). Subsystem 16.2 comprises I/O processor 16.2.2 (Director 2) and adapter 16.2.3 (SA2). A Director 3 and adapter SA3 associated with subsystem 16.3 are understood as possible added elements but not shown explicitly.

The groups of channels 16.1.1, 16.2.1 and 16.3.1 respectively associated with subsystems 16.1, 16.2 and 16.3, are also referred to herein respectively as Channel Group 1, Channel Group 2, and Channel Group 3. The channels of Channel Group 1 have individual I/O interfaces shown collectively at 16.1.4 for connection to peripheral controllers and devices. The channels of Channel Group 2 have I/O interfaces indicated collectively at 16.2.4. The channel interfaces of Group 3 are understood as possible additions but not shown explicitly.

Storage access requests are forwarded from adapters such as 16.1.3 and 16.2.3 to the storage access system 14 via respective buses indicated at 20 and 22 (the bus for the implied Group 3 adapter is not shown explicitly). Storage responses (data produced in response to fetch requests and status signals produced relative to the handling of store/input requests) are returned from access system 14 to adapters SA1, SA2 and SA3 through a single bus 30 having drops or ports accessible to each of the adapters. The bus 20 is referred to herein as the Group 1 In Bus and comprises 41 lines. Bus 22, the Group 2 In Bus, also contains 41 lines. The Group 3 In Bus would also contain 41 lines. Bus 30, referred to herein as the Out Bus, comprises 81 lines.

SA - CBC Interface

The "Group 1" interface between adapter 16.1.3 (SA1) and CBC 14.1 is indicated in FIG. 2. The interfaces between SA2 and the CBC, and between SA3 and the CBC are identical except for respective group line designations.

The Group 1 interface comprises the lines of Out Bus 30, lines of Group 1 In Bus 20, and seven control lines indicated collectively at 40 and individually at 40.1-40.7.

Advance line 40.1 is controlled by the CBC to signal the transfer of response information to SA1 (on Out Bus 30). This signal is sent shortly prior to said transfer. Transmit Enable line 40.2 is controlled by the CBC to enable transmission by SA1 on In Bus 20. This line is raised whenever buffer storage capacity in the CBC reserved for Group 1 traffic is not completely occupied.

The other five lines are controlled by SA1 and used by the CBC to control handling of signals presented on In Bus 20. Address Tag (ADR) line 40.3 is used (activated) to indicate presence of an address word part of a request on In Bus 20. D1 and D2 tag lines, 40.4 and 40.5, are used to order the positioning in doubleword spaces in storage of data words presented individually on In Bus 20; usually as part of a store/input request. QW (quadword) tag line 40.6 is used to indicate that a single associated request involves a transfer of four data words to two contiguous doubleword spaces designated by a single address. EOT tag line 40.7 is used to indicate conclusion of a request transmission sequence.

The storage adapter presents two types of requests to the CBC. "Store" or input type requests (S) require storage of one, two or four data words in a storage space designated by an address word included in the request. "Fetch" requests ($\bar{S}$) require retrieval of two or four data words from a storage space designated by an address word in the request.

Responses from the storage system are passed to the storage adapter via Bus 30. Bus 30 is capable of transferring two words of data in parallel. Each response comprises either two words of data retrieved in response to a Fetch request or status information associated with a store request. A Fetch request for four data words gives rise to two responses (usually consecutive).

Each address word presented on In Bus 20 includes channel identity information (CHID) which designates the source of the request (group channel or director). The CBC provides segregated handling of requests and responses of each group and returns the CHID information of each request in the associated response.

Timing and Format or Request Transfers

FIGS. 3 and 4 illustrate the timing and format of request transfers from SA to the CBC. FIG. 3 indicates the timing and format of Fetch requests. FIG. 4 illustrates the timing and format of Store requests.

The form and timing of a doubleword (two word) Fetch request is indicated at 50 in FIG. 3. The format and timing of a quadword (four word) Fetch request is indicated at 52 in FIG. 3. A request (either Fetch or Store) is presented by the SA only if the associated transmit enable line to that SA (e.g., 40.2, FIG. 2) is active; as suggested at 53. A doubleword Fetch such as 50 occupies three cycles of interface operation each having approximately 120 nanoseconds duration. The duration of an interface cycle is the same as the duration of a cycle of director operation and approximately the same as the duration of two consecutive cycles of CBC operation.

In the discussion which follows the term "idle" cycle is used to characterize cycle intervals of inactivity on the interface following presentation of EOT tag to the CBC by the subject adapter. The only system restriction imposed on the adapter relative to the CBC is that it allow for one such idle cycle after each presentation of EOT tag. It will be understood that such allowance of an idle cycle does not prevent the adapter ("b" sequence) controls from functioning during that cycle to prepare signals for the next cycle of active transmission.

A doubleword Fetch request transfer sequence, such as 50 (FIG. 3), occupies at least two cycles of interface operation; one "active" cycle followed by at least one "idle" cycle. In the active cycle the SA presents the address word on the Group In Bus (20) and simultaneously raises address tag and EOT tag. In the idle cycle the SA operates to prepare for the transfer of a next request. In the illustrated embodiment two idle cycles are allowed to simplify the control of the adapter relative to the preparation of the next request.

A quadword Fetch request transfer sequence, such as 52, occupies five cycles of interface operation of which four are actually necessary to fulfill system requirements. There is an active cycle, then an idle cycle, then another active cycle and finally two idle cycles. In the first active cycle the SA presents the address word (on its Group In Bus) with EOT and address tags (on respective tag lines). In the next active cycle (the third cycle) the SA presents only EOT tag and QW (quadword) tag, as suggested at 54; which the CBC interprets as an implied additional Fetch request (for two additional data words) relative to a storage space contiguous to the doubleword space designated by the address word received in the first cycle. The CBC reacts by contructing an additional request out of the original request. During the final two idle cycles the SA may prepare for the first active signaling cycle of another request.

In response to a Fetch request the CBC and PSCF utilize the address word to access an associated (designated) location in Store 12. Data retrieved from said location is incorporated in an associated response and passed to the origin SA on the Out Bus. The response includes source identity (CHID) information corresponding to identify information contained in the request. In response to a quadword Fetch the CBC uses the address word of one request to form two requests. The first request is the original request and is used to retrieve a first pair of data words from a storage space designated by the address in the original request. The second request is implied from the original request and is used to retrieve a second pair of data words from a storage space contiguous to the space designated by the original address. The address for the second request is formed from the original address by inverting a low order bit of the original address.

The transfer sequence of a singleword Store request, suggested at 60 (FIG. 4), occupies three interface cycles; two signaling cycles followed by one idle cycle. In the first cycle the address word is presented on the In Bus coincident with an address tag. In the second cycle a data word is sent with EOT tag and with either a D1 or a D2 tag. The choice of D1 or D2 is made by the SA in accordance with the value of an address bit (bit 29) which is furnished by the SA by the associated request source (channel or director) but is not included in the request information expressly presented on the In Bus. The D1 tag is used (by the CBC and PSCF) to store the data word in the "odd" half space of a doubleword storage space designated by the request address. The D2 tag is used by the CBC to store the data word in the "even" half space of a double-word space designated by the request address. During the second and third cycles the SA prepares for its handling of another request.

The transfer sequence of a doubleword Store request suggested at 62 occupies four interface cycles; three signaling cycles followed by one idle cycle. In the first cycle the address word is sent with address tag. In the second and third cycles two data words are sent consecutively with selected D tags. If the request is a "Store Backward" the D2 tag is presented with the first data word and the D1 tag with the second data word. If the request is an ordinary Store operation the D1 tag is presented with the first data word and the D2 tag with the second data word. During the third and fourth cycles the SA prepares for its handling of another request.

The transfer sequence of a quadword Store request suggested at 64 occupies seven interface cycles; three active SA signaling cycles followed by one idle cycle, followed by two active SA signaling cycles, followed by another idle cycle. In the first cycle the address word is presented with the address tag. In the second and third cycles two data words are presented consecutively with data tags (D1 first D2 second for an ordinary Store; D2 first D1 second for a Store Backward). The second data word is accompanied by EOT tag. In the fifth and sixth cycles two more data words are presented consecutively with the same sequence of data tags as the first pair of data words (D1 first for an ordinary Store, D2 first for a Store Backward). The QW tag is presented in either the fifth or sixth cycle. The EOT tag is presented in the sixth cycle. The SA prepares for its handling of another request during the sixth and seventh cycles.

In response to a QW tag with a Store request the CBC forms a second request including the second pair of data words and an address formed by inverting the low order bit of the original request address after forwarding the first pair of data words with the original address. Thus the second pair of data words is stored in a space virtually contiguous to the space receiving the first pair.

Request Information Format

FIG. 5 shows the format of address word and data word signal expressions referred to above in the discussion of FIGS. 3 and 4. The illustration is of bit context only. The bits need not be stored or transferred in the order illustrated.

The address word comprises: (1) a 4-bit storage protect key 72; (2) a 21-bit storage address consisting of two 8-bit address bytes 74 and 76 and five additional address bits 78; (3) a "fixed address" (FA) bit 80 which indicates whether a translation is required (in the CBC) to effect selection of the storage module (12.1, 12.2, 12.3, etc., FIG. 1) designated by the request address; (4) an operation bit 82 to distinguish Store requests (S=1) from Fetch requests (S=0); (5) four channel identity (CHID) bits 84 of which three bits are used to identify the requests source and one bit is used only for parity checking symmetry; and (6) four unused or spare bits 86. In addition there are six parity bits P; one for checking the storage protect key 72, two more for checking address bytes 74 and 76, another for checking FA and S; another for checking the byte formed by the five additional address bits 78 with bits FA, S and their parity bit, and one parity bit for checking the CHID.

The data word format consists of four data bytes 100, 102, 104 and 106, each accompanied by a respective parity bit, and four M (mark) bits 108. Each mark bit is associated with a different one of the data bytes. A separate parity bit is provided for the mark bits. The "1" mark bits are used to designate data bytes which are to be stored contiguously within the doubleword space designated by the request address. The "0" mark bits indicate data bytes which are not to be stored.

Request/Response Handling (General)

The general handling of request and response transfers is indicated in FIG. 6. At 118 the director or channel assembles a request. At 120 the director transfers the request to the associated SA and furnishes a select signal indicated at 122. The select signal activates a Request Ready latch (not shown here) which prepares SA controls to initiate handling of the request. At 124 the SA stores the request temporarily and, when enabled by Transmit Enable from the CBC at 126 (and other conditions of internal priority), forwards the request to the CBC (at 128). The CBC handles (stores and forwards) the request to the storage access controls at 130. The storage access controls process the request at 132 and return the associated response to the CBC. The CBC queues the response at 134 and presents it to the associated SA at 136 preceded by a group advance signal suggested at 138. As suggested at 140 the SA stores the response temporarily until it is retrieved by the director for eventual utilization relative to the request source (channel or internal director process).

While accepting the response at 140 the SA performs the ancillary operation of comparing the response CHID to the original request CHID. The SA also performs ancillary request timeout operations described later.

Request Transfer to the SA

A functional description of specific operations employed to transfer requests from the channels and director to the SA is given here. The circuits and controls used to carry out these operations will be described later.

Microprogram controls CS (FIG. 2) are shared by the channels and internal processes of the director by a Break In process described later. While a channel or internal process is being served these controls may assemble the information for a Fetch or Store request and pass it to the SA where it is enqueued in buffer arrays associated with the SA. When the request information has been enqueued in these arrays the shared microprogram controls may be released to serve another channel or internal director process.

Cycles of SA operation coincide with cycles of director operation and cycles of interface operation. The abovementioned buffer arrays associated with the SA are adapted to be accessible in a time division mode during discrete sub-cycle phases of each director/SA cycle of operation. These sub-cycle phases are hereinafter denoted "a", "b" and "c" time slots. The foregoing transfers of requests, and enqueueing thereof in the SA buffer arrays, are carried out in the "a" slots. The purpose and significance of this will be understood as this description develops.

Request Handling by the SA

Request forwarding operations are carried out by the SA independent of operations of the foregoing microprogram controls CS (FIG. 2) shared by the channels and internal director processes. A functional description of these operations is given here. The adapter circuits and sequencer controls used to carry out these operations will be described later.

Figure 7:
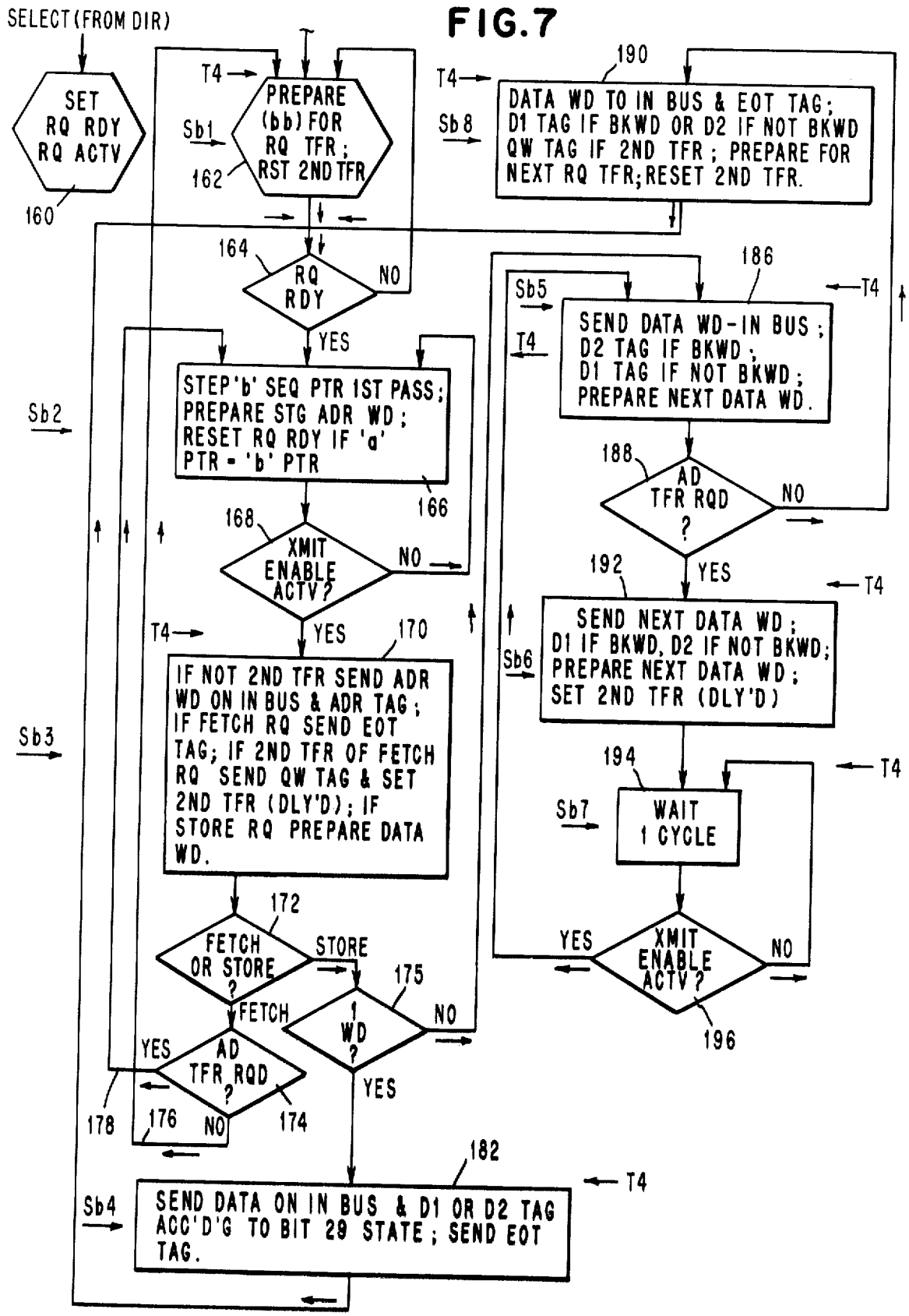
FIG. 7 illustrates the sequence of operations controlled by the "b" sequencer of the subject storage adapter in respect to the transfer of storage access requests to the channel bus controller.

Referring to FIG. 7, a "Select" signal originated by the foregoing shared microprogram controls of the director prepares Request Ready and Request Active conditions at 160. The latter condition is associated specifically with the request source (channel or internal director process). This enables an 8-state control sequencer in the SA to initiate actions required to extract an enqueued request from buffer arrays in the SA and to forward the request to the CBC via the In Bus. This sequencer accesses the SA buffer arrays in "b" time division slots of SA cycles and is therefore denoted as the "b" sequencer.

The "b" sequencer acts to forward requests in the order in which they are received by the SA. In its initial state $Sb1$ shown at 162 the "b" sequencer acts for the duration of an SA/interface cycle to prepare for forward transfer of a request. The Request Ready condition mentioned above is tested as shown at 164 and if no request is ready to be forwarded the "b" sequencer continues in state $Sb1$ for successive cycles until a request is ready.

When a request is ready the "b" sequencer advances to state $Sb2$ shown at 166. When this state is reached from $Sb1$ (rather than from $Sb3$ or branch 168, as described later) a "b" sequence pointer is incremented which effectively designates the queue position of the request which is to be forwarded next. Request Ready is conditionally reset (depending on the "b" pointer state) and the address word part of the "next" request is retrieved in the "b" slot for transmittal to the CBC in the next cycle. Test 168 is performed relative to the status of Transmit Enable line (40.2, FIG. 2) extending from the CBC to the associated SA.

When "Transmit Enable" is active the "b" sequencer steps in the next cycle to state $Sb3$ shown at 170. When this state is reached via the sequence $Sb1$, $Sb2$, $Sb3$ (rather than $Sb3$, $Sb2$, $Sb3$ considered later) it causes the address word part of the request to be transferred to the CBC (via the associated In Bus) for one full cycle and it causes associated tag signals (ADR and EOT if a Fetch request is being forwarded, ADR only for a Store request; see FIGS. 3, 4) to be presented to the CBC (via associated tag lines, 40.3 and 40.7 or 40.3 only; FIG. 2).In this state if a Store request is being processed (S = 1) the "b" sequencer prepares the data word to be forwarded in the next cycle (see FIG. 4).

From state $Sb3$ the sequencer branches its state in the next cycle according to the result of combinational tests 172, 174 and 175 carried out in state $Sb3$. Test 172 distinguishes the request type (Fetch or Store). Test 174 distinguishes the handling of a Fetch request as either complete or incomplete at this stage of handling (see FIG. 3 and note that a quadword Fetch requires an additional cycle of tag signaling, after address word transmittal, to present QW and EOT tags to the CBC). Test 175 distinguishes the data word width (one word or more than one) when the request currently being processed is a Store request.

If a doubleword Fetch request is being processed the handling is complete at this point and the "b" sequencer takes branch 176 of test 174 returning in the next cycle to initial state $Sb1$; where it prepares to serve another request. If a quadword Fetch is being handled the "b" sequencer takes branch 178 of test 174 and re-enters (returns to) state $Sb2$ in the next cycle.

In this re-entrant pass through state $Sb2$ no action is taken (corresponding to the idle cycle, in FIG. 3, after transmittal of the address word part of the quadword Fetch). Since "Transmit Enable" is invariably enabling (active) at this stage of quadword Fetch handling (refer to the above-referenced "Channel Bus Controller" patent application by Capowski et al and note presently that "Transmit Enable" can be dropped by the CBC only after a complete request has been forwarded) the sequencer remains in state $Sb2$ for only one cycle and steps immediately to state $Sb3$.

In this "re-entrant" pass through state $Sb3$, associated with handling of a quadword Fetch request, the "b" sequencer causes QW and EOT tags to be presented to the CBC (see FIG. 3) completing the request forwarding operation. At the end of this "re-entrant" cycle the sequence state invariably returns to state $Sb1$ via branch 176 of branch test 174.

Now consider the first passage to state $Sb3$ (after leaving state $Sb1$) and assume that a singleword Store request is being handled. The "b" sequencer would next step to state $Sb4$ shown at 182, taking branches at 172 and 175. In this state the data word prepared in state $Sb3$ is passed to the CBC via the In Bus with a D1 or D2 tag (on line 40.4 or 40.5, FIG. 2). The choice of D1 or D2 is made by the "b" sequencer in accordance with "lowest order" address information (bit "29") which is furnished to the SA by the request source but not forwarded to the CBC in the request. This choice determines whether the data word will be stored in the odd or even half of a doubleword space designated by the request address sent to the CBC.

This completes the request forwarding process and the preparational action of state $Sb1$ is not required. Consequently the sequencer branches via test 164 either to state $Sb1$ (if another request is not immediately available) or to state $Sb2$ (if another request is ready to be forwarded).

Now assume that a plural word Store request is being handled when state $Sb3$ is first entered. The sequencer would step from state $Sb3$ to state $Sb5$ shown at 186 (rather than to $Sb4$). This state $Sb5$ controls the transfer to the CBC of the data word prepared in state $Sb3$ and the preparation of another data word to be transferred in the next interface cycle (see FIG. 4). The word currently being transferred is sent with a D1 tag or D2 tag (depending upon whether the Store "direction" is normal or backward). From state $Sb5$ the sequencer branches at 188 either to state $Sb8$ shown at 190 or to state $Sb6$ shown at 192. If the second interface cycle of the transfer of a doubleword Store request or the fifth interface cycle of a quadword Store request is being completed the sequence branches to state $Sb8$. If the second interface cycle of a quadword Store transfer is being completed the sequence branches to state S*b*6.

In state S*b*8 the "second" data word prepared in state S*b*5 is forwarded with EOT tag and the appropriate data tag (D1 if backward, D2 if not backward), completing the request forwarding operation. The preparation functions of state S*b*1 are duplicated and branch 164 is taken either to state S*b*2 (if another request is ready) or to state S*b*1.

In state S*b*6 the second data word prepared in state S*b*5 is transferred with an appropriate D1 or D2 tag, and another data word (of a second pair of data words) is prepared during slot "b" of the associated cycle for transfer in a subsequent cycle.

The sequencer then sets an indication that a second transfer is in process and steps to state S*b*7 shown at 194. Here the sequencer idles for at least one cycle of delay (see FIG. 4) branching at 196 on the condition of the associated Transmit Enable line. When Transmit Enable is active the sequencer advances to state S*b*5 and steps through states S*b*5 and S*b*8 in the next two cycles to complete the handling of the request. In this second pass through state S*b*5, QW (quadword) tag is sent (see FIG. 4). In this (only) pass through S*b*8 tag is sent (see FIG. 4).

It should now be apparent that the operations of "b" sequencer controls for request forwarding, as characterized functionally above (and described later), are effective to produce the request signaling functions characterized graphically in FIGS. 3 and 4.

Response Handling

SA operations for response handling will now be described functionally. Circuit and control details will be given later. The applicable controls comprise a four-state sequencer operating independent of the "a" and "b" sequencers. Since this sequencer has access to buffer arrays in the adapter (SA) in "c" slots it is termed the "c" sequencer.

Figure 8:
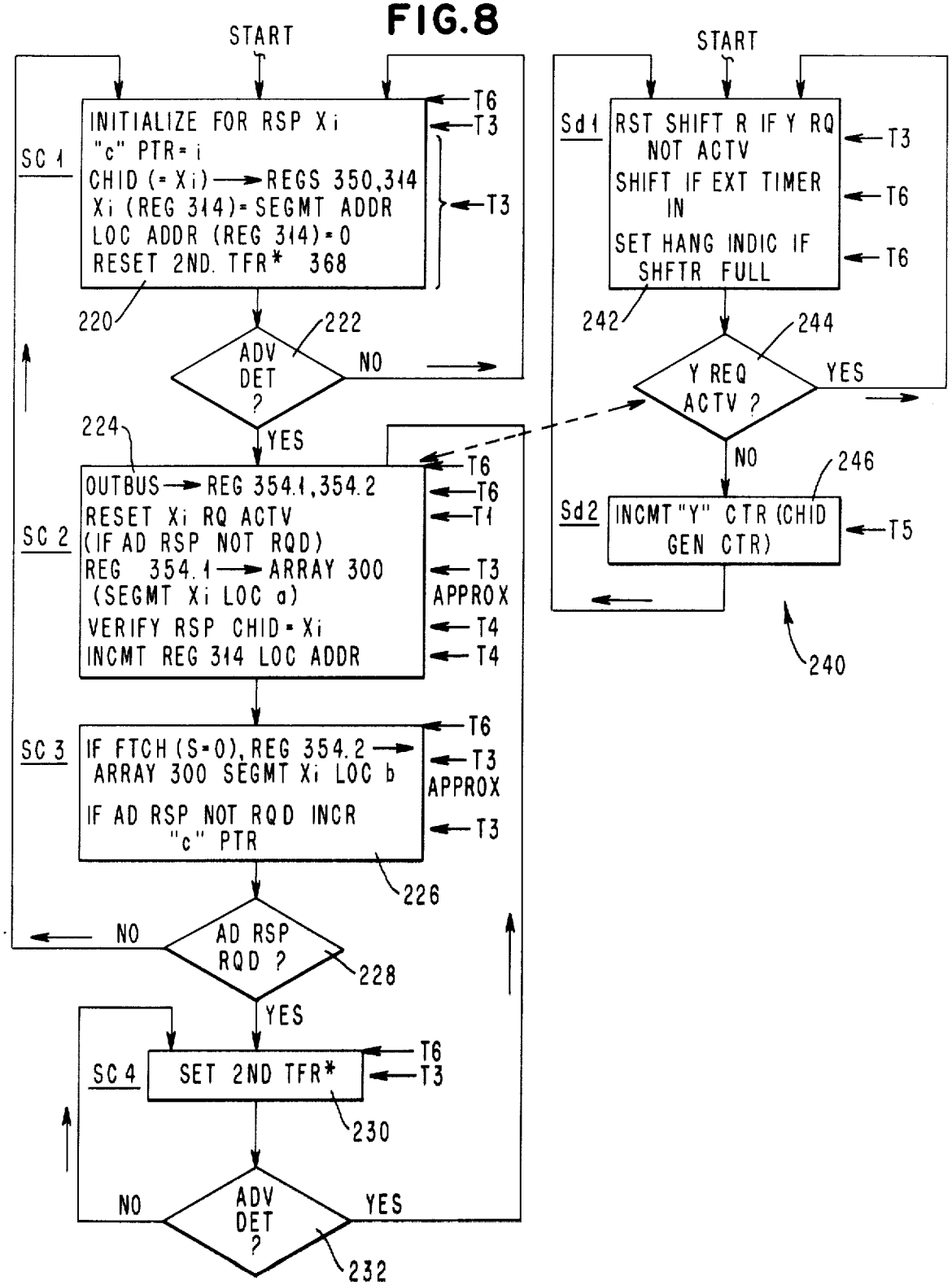
FIG. 8 illustrates the sequence of operations controlled by the "c" sequencer of the subject adapter in respect to the reception handling of storage responses associated with individual requests.

Referring to FIG. 8 in initial state S*c*1 indicated at 220 the "c" sequencer prepares to receive a next response from the CBC; branching repeatedly at 222 in successive cycles on the condition of the respective Advance line (40.1, FIG. 2).

At detection of Advance the "c" sequencer steps in the next cycle to state S*c*2 shown at 224. In this state (and cycle) the sequencer resets the Request Active condition set by the Select action of the "a" sequencer (122, FIG. 6) and causes part or all of the response to be stored in an SA array in the "c" slot of that cycle. If the response is associated with a Fetch request one data word, of a pair of "fetched" data words included in the response, is stored in the SA buffer array. In state S*c*2 the response CHID is compared to the original request CHID to verify that the response has been produced in the correct sequence.

From state S*c*2 the sequencer steps automatically to state S*c*3 shown at 226. If the response is associated with a Fetch request the second data word of the above-mentioned pair is stored in the SA buffer array. If another associated response is expected (i.e., the second response of a quadword Fetch), a branch is taken at 228 to state S*c*4 shown at 230. In state S*c*4 the controls set an indication that further action is required and branch (at 232) on the condition of Advance (from the CBC to this SA). When Advance is detected the controls repeat states S*c*2 and S*c*3 in two consecutive cycles (to absorb the data of the second response into the SA buffer array) and branch at 228 to state S*c*1 (to prepare for handling a next response).

If the response being processed in state S*c*3 is not associated with a Fetch request the "c" sequencer returns immediately to state S*c*1 at branch 228.

Hang Timing

FIG. 8 indicates a separately controlled timeout process at 240. This process tests the source-associated Request Active conditions mentioned previously in a fixed sequence. When an Active request is detected a "milliseconds long" timing process is carried out while the same request is tested repeatedly in each 120 nanosecond SA cycle. If the request is not reset to inactive within a certain "long" interval of time (39.6–52.8 milliseconds) a hangup condition is manifested to the director and to the service processor (18, FIG. 1).

When a request currently being tested is inactive or becomes inactive (e.g., by virtue of an operation performed by the "c" sequencer in state S*c*2) this timing process is reset and a "Y" counter which selects the next request (source) activity to be tested (request Y) is stepped. The reset is indicated at 242, denoted state S*d*1. The testing of the "Y" request activity is indicated as a branch at 244. If the request is inactive Y is incremented at 246 (denoted state S*d*2) and step 242 is repeated relative to a next source of request activity indication (Y + 1).

If source Y has an active request the Y count is not stepped and step S*d*1 is repeated. In each repetition a shifter, which indicates when the timeout has run its full course, is connected to a source of timing pulses spaced at relatively long intervals (13.2 milliseconds). If a timing pulse is not being received no action is taken for that SA cycle (120 nanoseconds). This process repeats in successive SA cycles until either the request is reset to inactive or a 13.2 ms timing pulse is received. In the latter case the shifter is shifted and a "1" is inserted into its lowest order stage. If a "1" appears in the highest order stage (examined in each repetition of S*d*1) a hangup condition is manifested (e.g., to the director and service processor).

Figure 9:
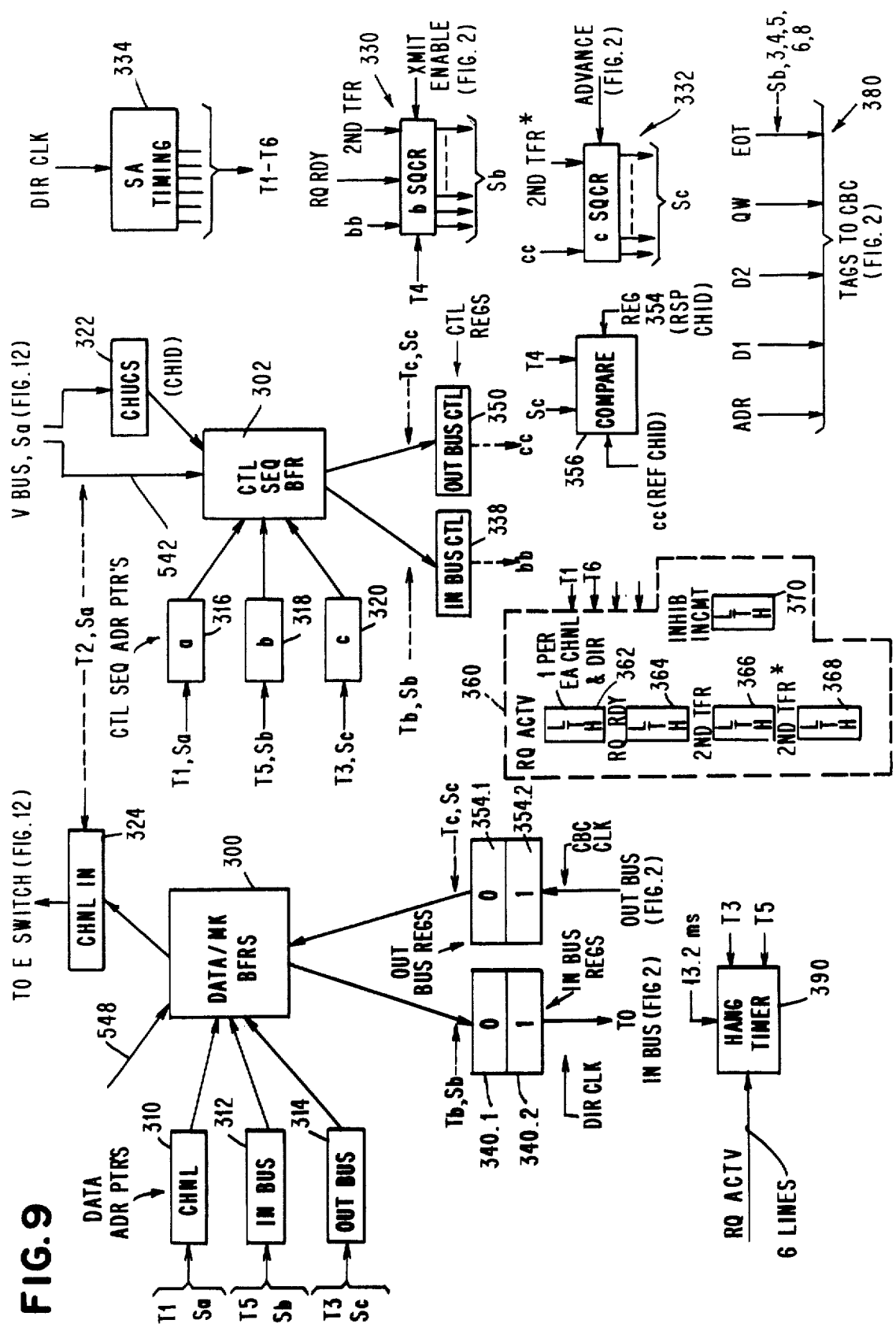
FIG. 9 illustrates the data flow and sequence control organization of the subject adapter.

SA Circuits (FIGS. 9 – 11)

Circuits of a storage adapter SA are illustrated schematically in FIGS. 9–11. Relevant timing functions are indicated in FIG. 14.

Solid state LSI buffer array 300 provides temporary storage of request and response information. Solid state LSI buffer array 302 provides temporary storage of CHID (channel identity) information designating request sources and other information associated with each request. Such other information includes bits S, B, W1 and W2. Bit S distinguishes the request type (Store if S = 1, Fetch if S = 0). Bit B indicates associated direction for Store requests (Backwards if B = 1, Not Backwards if B = 0). Bits W1 and W2 indicate request width (number of data words to be transferred to storage on a Store request or to the channel on a Fetch request; i.e., one if W1 = 1, two if W2 = 1, four if W1 and W2 are both 0).

These arrays are accessible three times per SA cycle (120 ns) in non-overlapping 40 ns portions ("a", "b" and "c" slots) of each cycle (see FIG. 14). In any "a" slot request information transferred from director output busing circuits may be entered into these arrays or response information may be extracted from array 300 and presented to director input busing circuits. In any "b" slot request information may be extracted from the arrays and placed in registers which have outputs connectable to the In Bus. In any "c" cycle information may be transferred out of array 302 into a register associated with control of response reception and response information may be entered simultaneously into array 300 from other registers which have inputs connectable to the Out Bus.

Array 300 shown in FIG. 10 consists of two arrays; a data buffer array 304 and a mark buffer array 306. Segments of these arrays are co-addressable. Each array contains eight segments individually dedicated to different sources of request activity (one to each channel, one to the director and one spare). Each segment such as 304.1 of data array 304 comprises eight individually addressable word locations; seven locations 304.1.1 for storage of data words and one location 304.1.2 for storage of request address information. Each segment of mark array 306 contains four individually addressable 5-bit locations, each location useful to hold mark information relative to one data word (of a Store type request) in the corresponding segment of array 304.

Array 302 shown in FIG. 11 contains eight addressable locations, each nine bits wide. Each location is used to hold control information associated with a request. Such control information includes: (a) two bits W1, W2 indicating the data word width W of the request (one if W1=1, two if W2=1, and four if both W1 and W2=0); (b) one bit S indicating the request type (S=1 indicates "Stores"; S=0 indicates "Fetch"); (c) one bit B indicating request "direction" for Store requests (B=1 indicates a "Store Backward" request; B=0 indicates an ordinary "Store" request); (d) one bit FA which, when 1, indicates that the part of the request address designating the module (12.1 . . . , FIG. 1) requires translation; (e) one bit, "bit 29" (which represents a lowest order bit of the address information furnished to the SA by the request source but not sent to the CBC); (f) three bits representing the CHID which designates the identity of the request source channel or director (all director internal processes have the same CHID=111); and (g) a parity bit.

Referring to FIG. 9 addresses for access to locations in arrays 300 are furnished by: counter-register 310 (channel pointer) in "a" slots, counter-register 312 (In Bus pointer) in "b" slots, and counter-register 314 (Out Bus pointer) in "c" slots. Addresses for access to locations in array 302 are furnished by: "a" pointer 316 in "a" slots, "b" pointer 318 in "b" slots and "c" pointer 320 in "c" slots.

Operations relative to arrays 300 and 302 in "a" slots are controlled by states "Sa" of the "a" sequence controls which are incorporated in the microprogram control store CS (FIG. 2) of the director processor described later. CHID information is loaded into array 302 in "a" slots from staticizing register 322 denoted CHUCS (since it holds the identity of the "channel using control store"). Register 322 is loaded by the director controls. Other control information is entered into array 302 in "a" slots, directly from output busing circuits of the director processor.

The CHID information in register 322 is also placed in register 310 associated with array 300 and is used as a segment address relative to arrays 304 and 306. Information extracted from array 300 in "a" slots is staticized in register 324 for full-cycle presentation to director circuits.

Operations relative to arrays 300 and 302 in "b" and "c" slots are respectively controlled by "b" sequencer 330 and "c" sequencer 332. Information extracted from these arrays in "b" slots is staticized for full cycles in registers and included in the address word parts of requests presented to the CBC via the In Bus. CHID information extracted from array 302 in "c" slots is staticized and compared to the CHID accompanying a response for verification that responses are being received in correct order. Response information is staticized for full cycles in registers and entered into arrays 300 in "c" slots.

Timing of the operations relative to said arrays in said slots and of the state changes and certain operations of the "b" and "c" sequencers is determined by timing signals T1, T2, . . . T6. These signals are derived from director clock timing by timing ring 334 (FIG. 9). These signals are overlapped in time (see FIG. 14) and span 30 ns (nanosecond) portions of the director cycle. Signal T5 coincides with part of the "a" slot. Signal T1 coincides with part of the "b" slot. Signal T3 coincides with part of the "c" slot.

Outputs $bb$ of array 302 in "b" slots are staticized for full cycles in In Bus control register 338 and used to control state changes of "b" sequencer 330 and to form part of the request address word when that word is transferred to the In Bus (and thereby to the CBC). The CHID value in register 338 is also placed in register 312 (in state S$b$1 considered later) for use in addressing a segment in arrays 300. Information extracted from arrays 300 in "b" slots is placed alternately in registers 340.1 and 340.2. Output of register 340.2 is connectable to the In Bus while register 340.1 is susceptible of receiving input from arrays 300, and register 340.1 is connectable to the In Bus while register 340.2 is loadable from arrays 300.

Outputs $cc$ of array 302 extracted in "c" slots, are staticized in register 350. Information in register 350 is also entered into register 314 as "c" slot segment address for arrays 300. Contents of register 350 control state changes of the "c" sequencer 332. Such contents include the request CHID which is applied under "c" sequencer control to compare circuits 356 for comparison with the CHID in an incoming response. Word portions of each response are received from the Out Bus alternately in "cycle-staticizing" registers 354.1 and 354.2 and transferred therefrom alternately into array section 304 (FIG. 10) of array 300 during "c" slots. Entries to array 300 are made from register 354.1 while register 354.2 is being loaded and from register 354.2 while register 354.1 is loaded.

Latches associated with the "a", "b" and "c" sequencers are indicated at 360. Request Active latch 362 and Request Ready latch 364 are set when a request is entered into arrays 300, 302 by action of the "a" sequencer controls in the director control store CS (FIG. 2). Request Ready may be reset by the "b" sequencer 330 when the associated request is processed (see state S$b$2 at 166, FIG. 7).

There is one Request Active latch for each potential request source (CHID) and only one Request Ready latch. Request Active is reset when an associated response is received (see state Sc2 at 224, FIG. 8). Request Active, when set, blocks the associated request source from competing for service by the director microprogram control store.

"2$^{nd}$ Transfer" latch 366 is set when a request being forwarded has a width of four data words and a part of the request has been forwarded to the CBC (see states S$b$3 and SB6, FIG. 7). This latch is reset when the remainder of the associated request has been forwarded (see states S$b$1 and S$b$8, FIG. 7).

Latch 368 (2$^{nd}$ Transfer*) is set when a response to a quadword Fetch is being received from the CBC and the first two data words of the response have arrived. This latch is reset when the remainder of the associated response has been received.

Inhibit Increment latch 370 is set by the "$b$" sequencer 330 in state S$b$2 and is used to prevent incrementing of "$b$" pointer 318 during the additional transfer operations associated with quadword requests. This latch is reset when the "$b$" sequencer reaches state S$b$8 or S$b$1.

The tag lines to the CBC are indicated at 380 and the hang timer circuits (described later) are indicated at 390.

SA Operation

In operation CHUCS register 322 and register 310 are repeatedly loaded with identity (CHID) information designating the entity (channel or internal director process) currently being served by the director microprogram controls. If an internal director process is being served the director identity ( = 111) is entered.

Initially pointers 316, 318 and 320 are set to identical address values designating on specific location in array 302 (e.g., location "X"). In "$a$" slots the value in register 322 is entered as a CHID representation into that location and the same value in register 310 is used as a segment address for "$a$" slot access to arrays 300. In "$b$" slots the same value is extracted from location X of array 302 and staticized in registers 338 (as "$b$" sequence control information) and 312 (as "$b$" slot segment address for arrays 300). In "$c$" slots the same value is extracted from location X of array 302 and staticized in registers 350 (as "$a$" slot control information) and 314 (as "$c$" slot segment address for access to arrays 300).

If a request is not loaded into arrays 300, 302, relative to the entity designated by the initial CHUCS entry, the registers associated with arrays 300, 302 will retain constant values until a next entity breaks in to be served by the director control store or until a request is loaded relative to the entity currently being served.

The "$b$" sequencer, initially in state S$b$1 (see FIG. 7), branches repeatedly (test 164, FIG. 7) on the state of the Request Ready latch 364. If a request is not ready the "$b$" sequencer remains in state S$b$1.

The "$c$" sequencer initially maintains state S$c$1 (FIG. 8) waiting for an "Advance" signal from the CBC indicating a response. If no request has been forwarded to the CBC there should be no "Advance" (if an erroneous Advance should be received at this point the CHID value in register 354.1 or 354.2 would not match the value in register 350 and compare circuit 356 would operate in state S$c$2 to produce an error indication).

When a request becomes ready for forward handling to the CBC the associated one of Request Active latches 362 will be set and Request Ready latch 364 will be set. The address in "$a$" pointer 316 will then be incremented to address a next location in array 302 during "$a$" slots.

Meanwhile the "$b$" sequencer (in state S$b$1) detects Request Ready at the next T1 time (FIG. 14 and test 164, FIG. 7) and steps to state S$b$2. This starts the request forwarding process relative to the associated request as described above. In state S$b$2 the address in "$b$" pointer 318 is incremented and the content of register 338 is effectively fixed until the request forwarding process is completed. Consequently when state S$b$1 is re-entered or state S$b$8 is reached the "$b$" sequencer is immediately ready to begin processing a next request.

When "Advance" is received (indicating a response to a forwarded request), the "$c$" sequencer steps to state S$c$2 (FIG. 8) to begin its process of response handling relative to registers 354.1 and 354.2 and array 300. The associated one of the Request Active latches 362 is reset during state S$c$2. In state S$c$3 the address value in "$c$" pointer 320 is incremented and register 350 is effectively preserved so that the "$c$" sequencer is prepared to begin serving a next response as soon as it returns to state S$c$1.

When one of the Request Active latches is reset the channel or internal director process associated with the respective request becomes eligible to contend for service by the director microprogram controls CS (FIG. 2). When such service becomes available the response is transferred from array 300 to a buffer in the director which is devoted to the associated channel or internal director process.

If the response to an active request is overdue the hang timer controls 390 will eventually test and timeout on that request; thereby producing a hangup indication.

Notably, there are no time restrictions between the "$a$", "$b$" and "$c$" sequencer processes. Thus, if a "Request Ready" is set by virtue of action in the "$a$" slot of a cycle the "$b$" sequencer may immediately begin its action on the associated request in the "$b$" slot of the same cycle, and as soon as "Request Active" is reset by virtue of "$c$" sequencer action in the "$c$" slot of a cycle the "$a$" sequence may be able to begin action on the response in that cycle.

Some of the relevant time relationships between "$a$" and "$b$" slot activities are indicated in FIG. 14 (last 11 lines).

Figure 12:
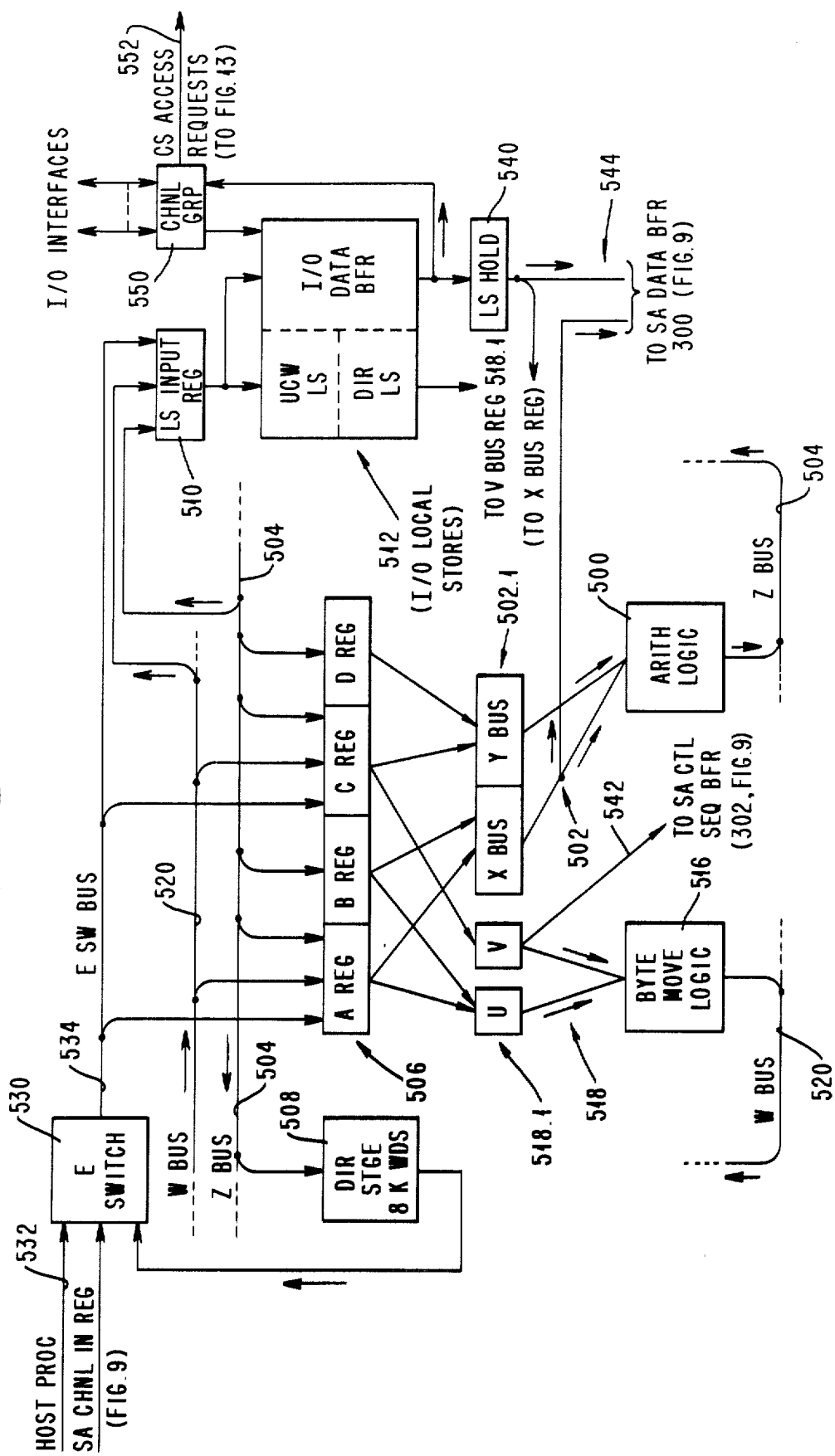
FIG. 12 illustrates the organization of the director (IOP) system with particular emphasis on circuit parts relevant to the operations of the subject adapter.

Director Data Flow (FIG. 12)

The director system, illustrated schematically in FIGS. 12 and 13, is generally similar to the data processing system described in the above-referenced U.S. Pat. No. 3,585,599 to Hitt et al. disregarding adaptations for the subject "$a$" sequencer actions mentioned above (and described below).

Word arithmetic logic 500 receives 36-bit words (32 information bits, four parity bits) from X and Y buses indicated at 502 and transfers a logically related result word to Z bus 504. Z bus 504 links through selective gating connections to inputs of word storage registers: A, B, C and D, indicated generally at 506. Z bus 504 also connects through gates to an 8,000 word capacity solid state array 508 used exclusively by the director and to an input register 510 which serves several input-/output local store buffer arrays indicated collectively at 512.

Byte move logic 516 provides logical manipulation of bytes (eight bits plus parity) received from U and V buses indicated generally at 518; result bytes passing to W bus 520. W bus 520 links through not-shown gates to inputs of the A and C registers of the register group 506 and also to inputs of register 510 serving the buffer arrays 512.

E switch 530 receives response inputs from register 324 (FIG. 9) and other inputs from director storage array 508 and host bus 532 (extending from host processor 10, FIG. 1). Outputs of this switch transfer to E switch bus 534. Bus 534 feeds gates connecting to inputs of A and C registers in register group 506. E switch bus 534 also feeds gates connecting to inputs of register 510 serving the I/O local storage arrays 512.

Registers 506 feed gates connecting to inputs of registers 502.1 which feed inputs to X and Y buses 502 and to registers 518.1 feeding the U and V buses 518. Outputs of arrays 512 pass to register 540 which feeds X bus register 502.1.

Extension 542 of the V bus feeds switchably to array 302 (FIG. 9). Bus extensions 544 of Register 540 and the X bus feed switchably to input bus 548 (FIG. 9) of array 300.

In operation information signals circulate switchably from registers 506 and 540 to registers 518.1 and 502.1 to the U, V, X and Y buses. These buses feed switchably into arithmetic and move logic networks 500 and 516 and arrays 300 and 302 in the SA. Result outputs of logic 500, 516 pass switchably to Z and W buses 504, 520 which feed registers 506 and storage arrays 508 and 512. Arrays 512 feed register 540 which feeds SA array 300 (FIG. 9). Arrays 300 and 508 feed E switch 530 completing a network of circuits to registers 506 and arrays 512.

The I/O channel group indicated at 550 communicates with this system via arrays 512 and access requests 552 to control store CS (FIG. 13).

Director Control Store

FIG. 13 shows the microprogram control store array 600 which represents control store CS of FIG. 2 and serves to control the circuits of FIG. 12. This is a solid state array containing microinstructions arranged in predetermined sequences to form microprograms. These microprograms control the various circuits of the director (FIG. 12) and provide the "a" sequencer actions of the subject storage adapter (FIG. 9).

In each director cycle address selector 602 addresses a selected location in array 600. A microinstruction in that location is placed in control store data register 604 and used to control the actions of director circuits (FIG. 12) in that cycle. If the microinstruction is one associated with the "a" sequence it may also be used to feed request information to arrays 300, 302 (FIG. 9), to set Request Active and Request Ready latches such as 362, 364 (FIG. 9), or to extract a response from array 300.

Field portions of the current microinstruction in register 604 are decoded by decoding circuits 606. Outputs of circuits 606 operate groups of control lines 608 and 610. Lines 608 control director circuits. Lines 610 control bussing circuits between the director and SA. "Next state" selection logic indicated at 612 uses "present state" outputs of register 604 and other present status conditions indicated at 614 to provide next address inputs to address selector 602. Thus microinstructions in array 600 may be accessed automatically in a programmed sequence.

Register 602 may also be loaded from one of a plurality of registers indicated collectively at 620, instead of from next state logic 612, under circumstances determined by Break In priority selection circuits indicated generally at 622. Registers 620 include a plurality of registers utilized exclusively by the director and at least one register for each of the channels 550 (FIG. 12). When a channel or internal director process is granted "break in" access to the control store system 600, 602, 604, an address value contained in its associated register 620 is transferred to address selector 602 and used in that cycle as the initial microinstruction of a microprogram sequence associated with the operation required to serve that channel or process. Registers 620 are loaded at system start-up time and other times with values suitable for initiating operations to serve the director and each channel. Activation of circuits 622 initializes register 624 to indicate the identity of the channel or process which has been granted service.

Lines 610 in association with register 624 extend "Sa" control to the storage adapter of FIG. 9. These lines carry sequence control signals Sa to the storage adapter SA and thereby control gating into arrays 300 and 302 (FIG. 9), gating from register 624 into CHUC's register 322 (FIG. 9) and register 310 (FIG. 9), setting of a selected Request Active latch 362 (FIG. 9) and setting of Request Ready latch 364 (FIG. 9). Functions of these lines are identified individually in the following table.

| Line Name | Line Function |
|---|---|
| ABI | Initializes the location address in channel pointer 310 at break in to point to location 0 of the associated segment. |
| SAVE | Initializes location address in channel pointer 310 to value 4 for "Save" operations. |
| X-SA | Transfers request information from director X bus to buffer 300 and increments location address in channel pointer 310. |
| ADR-SA | Stores request address in section 304 (FIG. 10) of array 300 (FIG. 9). Address is stored in segment 304.1 designated by CHUCS 322 (FIG. 9) at segment location 304.1.2 (FIG. 10). |
| SA-ESW | Transfers contents of register 324 (FIG. 9) to director E switch (FIG. 12); increments location address in register 310 (FIG. 9) after transfer. |
| LS-SA | Transfers request information from a channel buffer in array 512 (FIG. 12) into arrays 300, 320 (FIG. 9). |
| SELECT | Transfers request information to control sequence buffer array 302 (FIG. 9); steps "a" pointer 316 (FIG. 9); sets associated Request Active latch 362 (FIG. 9) per CHUCS; and permits Request Ready 364 (FIG. 9) to be set at next T1 time. |
| FA | Inputs Fixed Address bit FA to buffer array 302 (FIG. 9) at Select time. |
| S | Inputs request S bit to buffer array 302 at Select time. |
| WL | Inputs Width bit W1 to buffer array 302 at select time; if value of bit W1 is 1 a one word Store request is indicated. |
| W2 | Inputs Width bit W2 to buffer array 302 at Select time; W2 = 1 denotes a 2-word request; W1 and W2 both 0 denotes a quadword request. |
| RESET | Resets FA, S,. W1, W2 bits in array 302. |

In operation the above system, when serving a channel or a director process, may assemble a storage access request and enter such into SA arrays 300, 302 during "a" slots. Line ABI energized at Break In transfers an associated CHID from register 624 (FIG. 13) to registers 310 and 322. "ADR-SA" transfers the request address to array 300. Select, FA, S, W1 and W2 lines are activated to transfer associated request control information into array 302 at the location designated by the current content of "a" pointer 316. Select also increments "a" pointer 316, sets the associated Request Active and prepares Request Ready to be set at next T1 time (see FIG. 14); thereby preparing the storage adapter to be able to initiate the "b" sequence operations required to forward the request to the CBC.

Lines X-SA and LS-SA are activated to transfer request information into buffer arrays 300, 302 from the director and channels. After certain operations of these lines a low-order position in register 310 is incremented so that data words (of a Store request) are placed successively in the first four data word locations of the segment such as 304.1 (FIG. 10) in array 300 which is designated by the part of register 310 which holds the same value as register 322.

Issuance of Select sets Request Active latch associated with the request source and the common Request Ready latch. This initiates advancement of the "b" sequence of the storage adapter. The "b" sequencer then operates to forward the request from arrays 300 and 302 to the CBC (via the In Buffer).

Request Ready is reset in state Sb2 of the "b" sequencer if the value in registers 316 and 318 are identical ("a" pointer = "b" pointer). The high order bits (segment address) contained in register 312 (FIG. 9) during the "b" sequence will correspond to the CHID (channel identity) value staticized in register 338 (FIG. 9). Consequently the segment addresses in registers 310 and 312 will be identical only when the request being passed to the In Bus corresponds to the request last received by the storage adapter (from the director and channels). Conversely indication that these values are unequal means that an additional request is ready for "b" sequence processing and therefore resetting of Request Ready is undesirable.

When a response is received via the Out Bus the storage adapter "c" sequence controls reset the Request Active latch associated with the source (CHID) of the associated request. Resetting of a Request Active latch enables control store access requests of the associated source to contend for Break In service at priority selection circuit 622 (FIG. 13). Thus when a response is available in array 300 and the associated Request Active latch is reset the associated source (assuming that it is in a state of preparedness for accepting a response, i.e., that its request for Break In service is active, and that it has priority relative to other contending sources) will be granted Break In access to the control store system 600, 602 and 604 and thereby recover the response. In such operations control store system 600, 602, 604 activates lines ABI and SA-E to cause the information of the response to be transferred from the storage adapter array 300, via register 324 (FIG. 9) and via the E switch 530 (FIG. 12), to the appropriate director or channel circuit.

"b" Sequencer

Figure 15:
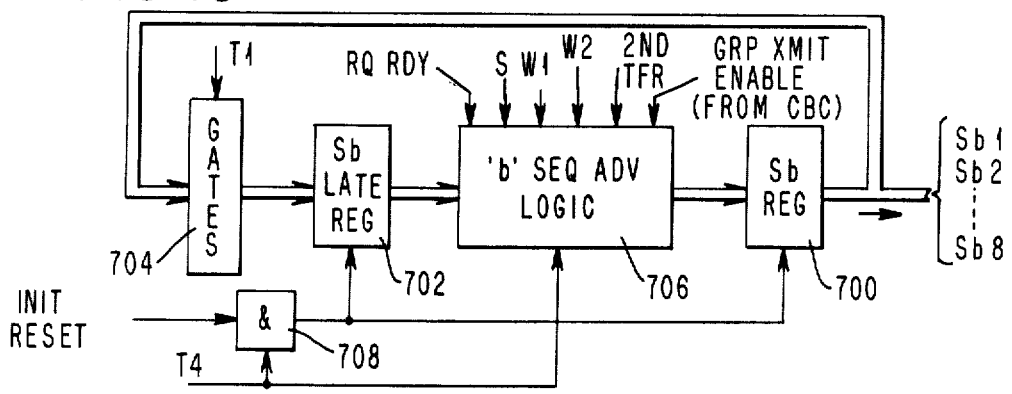
FIG. 15 illustrates the "b" sequencer of the subject adapter.

The "b" sequencer illustrated in FIG. 15 is described in relation to FIGS. 7 and 14. Sb register 700 provides eight distinct output state indications Sb1, Sb2, ... Sb8. At T1 times (FIG. 14) state values are transferred from register 700 to register 702 (Late Sb) via gates 704. New state values may be entered into register 700 at T4 times by operation of logic 706. "Initial Reset" operates AND 708 to set registers 700 and 702 to representation of state "Sb1".

Logic 706 operates in accordance with the following Boolean truth table to establish new "b" sequence states (new values in register 700).

| State of Sb Reg | * Produced by: |
|---|---|
| Sb1 | T4 · [INIT RESET + $\overline{\text{RQ RDY}}$ · (Sb4 + Sb8) + Sb3 · $\bar{\text{S}}$ · (2nd TFR + W2)] |
| Sb2 | T4 · [RQ RDY (Sb1 + Sb4 + Sb8) + Sb3 · S · $\overline{\text{2nd TFR}}$ · $\overline{\text{W2}}$] |
| Sb3 | T4 · [Sb2 · XMIT ENABLE] |
| Sb4 | T4 · [Sb3 · S · W1] |
| Sb5 | T4 · [Sb3 · S · $\overline{\text{W1}}$ + Sb7 · XMIT ENABLE] |
| Sb6 | T4 · [Sb5 · W2 · $\overline{\text{2nd TFR}}$] |
| Sb7 | T4 · [Sb6] |
| Sb8 | T4 · [Sb5 · (2nd TFR + W)] |

* In this column:
"·" Denotes "AND"
"+" Denotes "OR"
"Sb-" refers to state of "Sb Late"

In state Sb1 (162, FIG. 7) Request Ready latch 364 (FIG. 9), is tested (see test 164, FIG. 7) to determine whether a request is ready in buffer arrays 300 and 302 (FIG. 9).

When a request is ready sequence advance logic 706 transfers a value associated with state Sb2 (166, FIG. 7) into Sb register 700 (at T4 time). In this entry to state Sb2 the value in "b" pointer register 318 (FIG. 9) is incremented, the address word part of the request (Address, S, FA, SP, CHID) is fetched from array 300 to one of the registers 340.1 or 340.2 and from array 302 to register 338. Request Ready is reset (if the "a" and "b" pointers are equal), and Inhibit Increment latch 370 is set (this latch is reset in state Sb8 or on the return to state Sb1). Setting of Inhibit Increment blocks further incrementing of "b" pointer 318 in later passes through Sb2 for this request.

In each pass through state Sb2 the associated Transmit Enable line (from the CBC to this SA) is tested (168, FIG. 7) to determine whether the CBC is available to accept a request. If the CBC is not available Sb2 is repeated but "b" pointer is not incremented. If the CBC is available the value in register 700 is changed (at T4 time) to the value associated with state Sb3 (see 170, FIG. 7).

In the first pass through state Sb3 ("2nd Transfer" not set) the storage address staticized in one of the registers 340.1, 340.2 is transferred (gated) from that register to the In Bus for one full cycle. At the same time the associated bit functions staticized in register 338 — S, FA and CHID — are transferred from that register to the In Bus as part of the address word. At the same time ADR tag is sent on line 40.3 (FIG. 2). If the request is a Store type request (S = 1) the data to be sent next cycle (see FIG. 4) is fetched from array 300 to the "other" one of registers 340.1, 340.2. If the request is a Fetch (S = 0) EOT tag is sent on line 40.7 (FIG. 2) while the address is being sent.

State Sb3, provides tests of S, W and "2nd Transfer" in logical combinations (tests 172, 174, 175, FIG. 7) to determine the next state of Sb. If the address part of a quadword Fetch is being forwarded (S, W1, W2 all "0" and "2nd Transfer" not set) "2nd Transfer" is set late (after T1 time) and tests 172 and 174 steer the sequencer to state Sb2. If the address part of a doubleword Fetch is being forwarded (S = 0, W2 = 1 at state Sb3) tests 172 and 174 steer Sb to initial state Sb1 at T4 time; whereby the "b" sequence is prepared to handle another request if one is ready for handling.

When state S*b*2 is reached via branch 178 of test 174 (quadword Fetch handling) "Inhibit Increment" and "2$^{nd}$ Transfer" will both be in set condition. Consequently "*b*" pointer 318 will not be incremented and the only useful action taken will be to advance to state S*b*3 at next T1 time (Transmit Enable cannot fall while a Fetch request is being forwarded). In the associated second pass from state S*b*2 to state S*b*3 the QW and EOT tags are sent (see 54, FIG. 3).

If the request being handled in the first pass entry to state S*b*3 is a Store request test 175 branches the sequence either to state S*b*4 (182, FIG. 7) if a singleword request is being processed or to state S*b*5, (186, FIG. 7) if a plural word request is being handled. In state S*b*4 the data word prepared in one of the registers 340.1 or 340.2, by the action of state S*b*3, is transferred to the CBC (via the In Bus) with a data tag (D1 if Bit 29 = 0, D2 if Bit 29 = 1) and EOT tag. From state S*b*4 the sequence returns to state S*b*1.

In state S*b*5 a data word prepared either in state S*b*3 or state S*b*6, is transferred to the CBC (via the In Bus) with D1 or D2 tag (D2 if bit B = 1 in register 338, indicating a Store Backward request; D1 if the request is not a Store Backward request), and a data word to be sent in the next cycle is prepared in the register 340.1 or 340.2 which is not currently feeding the In Bus. In state S*b*5 "2$^{nd}$ Transfer" latch 366 and bit W2 (staticized in register 338) are tested (test 188, FIG. 7) to determine whether an additional doubleword transfer is required. Bit W1 is impliedly zero because W1 = 1 denotes a singleword transfer and branch 175 to S*b*5 negates this possibility. If bit W2 is also 0 (indicating a quadword transfer) and "2$^{nd}$ Transfer" is not set (indicating that only two data words have been sent) test 188 branches the sequence state to S*b*6 (192, FIG. 7).

State S*b*6 is used to transfer the (second) data word prepared in state S*b*5 to the In Bus and to present the appropriate tag, D1 or D2, in accordance with the value of the B bit. This state is also used to prepare the (third) data word which is to be sent next. S*b*6 sets "2$^{nd}$ Transfer" latch late in the cycle (after T1 time).

From S*b*6 the sequence steps unconditionally to state S*b*7 to perform a "wait" step of at least one cycle prior to initiating the transfer of the second pair of data words of this quadword Store (see FIG. 4). When Transmit Enable is active (test 196, FIG. 7) the sequence branches from state S*b*7 back to state S*b*5 and the action of state S*b*5 is repeated (thereby sending the third data word with suitable tag and preparing the fourth data word).

From state S*b*5 the sequence branches to state S*b*8; on the first pass out of S*b*5 for a doubleword Store or on the second pass for a quadword Store. In state S*b*8 the last data word is sent, with EOT tag and appropriate D tag, and the "2$^{nd}$ Transfer" and Inhibit Increment latches are reset. Branch 164 (FIG. 7) is then taken either to state S*b*2, if another request is ready, or to S*b*1 otherwise. State S*b*1 also resets "2$^{nd}$ Transfer" and Inhibit Increment.

"*c*" Sequencer

Figure 16:
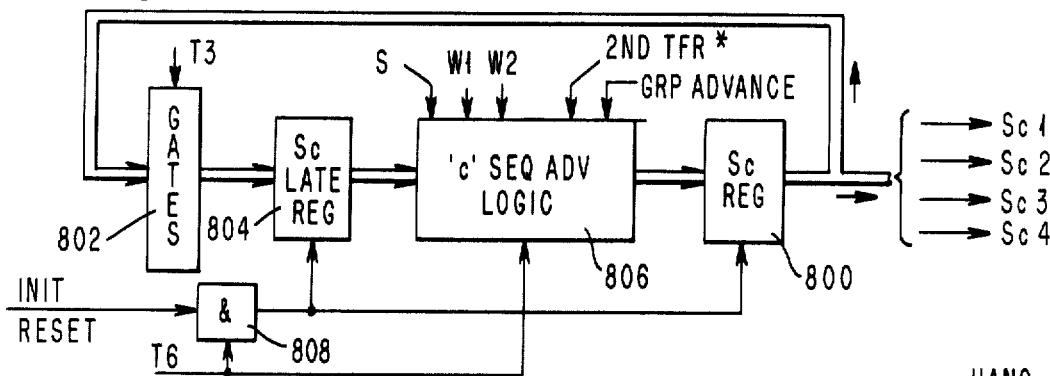
FIG. 16 illustrates the "c" sequencer of said adapter.

The "*c*" sequencer, shown in FIG. 16 and described with reference to FIGS. 8 and 9, is a 4-state device initiated in state S*c*1. The current sequence state is established in register 800 at T6 time and transferred through gates 802 into "late" register 804 at T3 time. Late register 804 conditions sequence advance logic 806 in combination variously with S, W1, W2, 2$^{nd}$ Transfer* (latch 368, FIG. 9) and CBC GRP Advance 40.1 (FIG. 2). Logic 806 selectively alters (or does not alter) the state value held currently in register 800. S, W1 and W2 are staticized in, and manifested by, register 350 (FIG. 9) which is loaded from a location in array 302 designated by "*c*" pointer 320.

State S*c*1 (220, FIG. 8) may be induced by "Initial Reset" operation of AND 808 or as the next state after state S*c*3 via branch 228 (FIG. 8). State S*c*1 resets 2$^{nd}$ Transfer* (latch 368, FIG. 9) and the sequence branches on detection of CBC Advance (40.1, FIG. 2; test 222, FIG. 8).

As explained previously the value in "*c*" pointer 320 (FIG. 9) is initially the same as the values in "*a*" and "*b*" pointers 316 and 318, and is incremented only when a response is processed. Consequently state S*c*1 serves initially to test for an Advance relative to the response associated with the first activated request. Upon detection of Advance the value in register 800 is changed to the value associated with state S*c*2 (see 224, FIG. 8).

State S*c*2 resets the Request Active latch associated with the request source (i.e., the latch designated by the CHID value currently staticized in register 350). If the response is associated with a Fetch request it includes two data words (without mark bits) which are transferred in parallel into registers 354.1 and 354.2 at T1 time. Contents of register 354.1 are passed to array 300 in the "*c*" slot (next T3 time) and stored in either the first or third word location of the seqment designated by the CHID in register 350 (the third location on the second response to a quadword Fetch; the first location otherwise). At the time the response is received the parity of the information contained in register 350 is verified and the CHID (channel identity) portion of that information is compared to a CHID value included in the response (if the two are not identical error will be indicated).

If the response being processed is associated with a doubleword Fetch, or if the response is the second response of a "quadword Fetch" pair, the parity check status of the response information is placed in a check array not shown and is thereby available for external inspection (e.g., by the director).

From state S*c*2 the value in register 800 is automatically changed in the next cycle to the value associated with state S*c*3. If the response is associated with a Fetch the second data word of a response pair is transferred from register 354.2 into buffer array 300 and stored at either the first, second or fourth word location of the segment designated by the CHID in register 350.

The first location is selected on a response to a singleword Fetch (W1 = 1) designating the second word of the retrieved pair (address bit 29 = 1); thereby effectively over-writing the first word of the pair. The fourth location is selected on a response to a quadword Fetch. On all other Fetch responses the second location is selected.

If no further response is due state S*c*3 increments the "*c*" pointer 320 and state S*c*1 is re-entered via branch 228. If an additional response is due (i.e., the second half of the response to a quadword Fetch) branch 228 leads to state S*c*4. This state sets 2$^{nd}$Transfer* latch 368 (FIG. 9), indicating that additional handling is due, and at the next Advance from the CBC (test 232, FIG. 8) the sequence branches to state S*c*2. Operations of states S*c*2 and S*c*3 are then repeated (to absorb the additional response data) and the sequencer returns to state S*c*1.

The logic of "c" sequence advance logic 806 is indicated by the following truth table:

| STATE OF Sc REG | PRODUCED BY |
|---|---|
| Sc1 | T6 · [($\overline{\text{AD RESP RQD}}$· Sc3) + (Sc1 · $\overline{\text{ADV DET}}$) + (INIT RESET)] |
| Sc2 | T6 · [(ADV DET) · (Sc1 + Sc4)] |
| Sc3 | T6 · Sc2 |
| Sc4 | T6 · [(Sc4 · $\overline{\text{ADV DET}}$) + (Sc3 · AD RESP RQD)] |

*AD RESP RQD = QUAD REQUEST · SECOND XFER

Hang Timer

The hang timer logic is indicated in FIG. 18. Specific cases of timing are indicated in FIG. 17. The CHID generator counter 900 designates the CHID association of the next request (Rx) eligible to be timed. The eight state outputs of this counter are denoted R0 through R7 (Rx being used to indicate an arbitrary one of the eight possible states). Each output position Rx conditions an associated pair of AND circuits 902 and 904. If Rx is "on" and the associated request active latch is not set AND circuit 902 associated with Rx transfers a resetting impulse to 4-place shifter 906, through OR circuit 908 at the next T3 time. Resetting of the shifter effectively terminates a timing process relative to the request associated with Rx. With Rx on and the associated request active latch not set associated AND circuit 904 is operated at the next T5 time to transfer stepping excitation to counter 900 via OR circuit 910. This advances counter 900 to its next position (Rx + 1). Conversely if Rx is active and the associated request active latch is set shifter 906 will not be reset and counter 900 will not be stepped.

AND circuit 912 prepared by T6 and Not T5 tests for the presence of a 13.2 millisecond timer pulse. This pulse is externally derived (e.g., from the host processor or other source). Operations of AND 912 sets latch 914 at 13.2 millisecond intervals which are virtually infinitely longer than the 120 nanosecond intervals of director and SA cycles of operation. It will be understood that the time 13.2 milliseconds is not critical but merely indicated as a convenient "very long" interval of time relative to the cycle time of the director. The transition to set condition of latch 914 transfers shift excitation to shifter 906 and enters a "one" bit into the low-order stage of the shifter. Latch 914 remains set only momentarily due to operation of AND circuit 916 which is stimulated to reset latch 914 shortly after it is set. If shifter 906 is not reset between intervals of reception of the 13.2 millisecond external timing impulses the shifter will advance the bit entered by latch 914 eventually to the highest order position of the shifter and manifest a hang indication.

The number of stages of the shift register is not critical. The important point is that the number of stages in the shift register and the time of the millisecond timer should be effective in combination to produce a time out delay of sufficient length to ensure that the condition being timed represents a true "hang-up" and not merely a transient system delay.

Case 1 (FIG. 17) shows that if the request associated with Rx is not active at T3 time the shifter is reset at T3 time and the CHID generator counter is stepped at T5 time. Case 2 indicates that if the request associated with Rx is active at T3 time resetting of the shifter 906 and stepping of CHID counter 900 will be blocked, but if the same request thereafter becomes inactive by action of Sc2 (FIG. 8) the shifter will thereafter be reset and the counter will be stepped. Case 3 shows that if the request associated with Rx is continuously active over the full timeout period of 52.8 (4 × 13.2) milliseconds a hangup condition will be manifested.

CONCLUSION

The sequencer described above operates to provide concurrent enqueueing of requests and responses in buffer arrays 300 and 302, transferral of requests to the CBC, reception of responses from the CBC, and transferral of enqueued responses to the director.

Ancillary operations are performed to verify that each actually received response is associated with the request forwarded in the same sequence order as that response. Such operations neither delay nor interfere with the principal operations of response handling.

Other ancillary operations provide hang-up detection without specific inter-dependencies relative to the request forwarding functions.

It is noteworthy that the time division order of the "a", "b" and "c" slots (in which the respective sequencers access enqueueing arrays 300 and 302) provides unique possibilities of time contiguity between the "a" slot in which a request is enqueued and the "b" slot in which the subject adapter begins its forward handling of that request. If the just-mentioned "a" slot (of enqueueing) occurs while the "b" sequencer is in state $Sb1$, and no other (earlier) request is in the queue (arrays 300, 302), the "b" sequencer would advance immediately to state $Sb2$ (see FIGS. 7 and 14) and thereby immediately begin its handling of the associated (just-enqueued) request.

While the invention has been particularly shown and described with reference to a preferred embodiment thereof, it will be understood by those skilled in the art that various changes in form and detail may be made therein without departing from the spirit and scope of the invention.

What is claimed is:

1. In association with an input/output processing subsystem of a data processing system and a storage access subsystem of said data processing system, said storage access subsystem including means for generating responses associated with storage access requests, and adapter for linking said subsystems comprising:
  a buffer storage array;
  first means for transferring fetch and store requests for access to said storage access subsystem from said input/output processing subsystem to said buffer storage array;
  second means for transferring said requests from said array to said storage access subsystem;
  third means for transferring responses associated with said requests from said storage access subsystem to said array;

fourth means for transferring said responses from said array to said input/output processing subsystem; and sequence control means, coupled to said input/output subsystem and operating in a time division mode, for enabling concurrent operation of said first, second, third and fourth means on a time division basis for handling multiple requests and responses concurrently through said array; said sequence control means including means for providing maximum potential time adjacency between the operations of said first and second means relative to any request.

2. An adapter in accordance with claim 1, wherein said requests are susceptible of being originated by multiple separate channel sources associated with said input/output subsystem and said responses are normally furnished to said third means in a sequence order corresponding to the order in which said requests are transferred from said second means to said storage access subsystem, characterized in that:

said sequence control means comprises means associated with said third means for verifying the sequential association between requests transferred to said storage access subsystem and responses returned to said adapter by comparing channel source identity information incorporated in said requests and responses.

3. An adapter in accordance with claim 1 including:

hangup timing means operating independently of said input/output subsystem and said sequence control means for timing out the durations of activity indications associated with said requests in a sequence which is independent of the order of request generation; and thereby distinguishing instances in which a response is overdue without potential obstruction of the handling of requests and responses.

4. In association with an input/output processing subsystem of a data processing system and a storage access subsystem of the same data processing system, said input/output processing subsystem being shared by a group of plural input/output channels, an adapter for linking said subsystems for exchange of storage access (fetch and store) requests originated by said channels and associated responses comprising:

an addressable data buffer array containing a separate segment of spaces reserved for each of said channels;

a control sequence buffer array containing plural spaces for holding source channel identity information and control information associated with requests furnished by said channels;

first means associated with said data buffer array, said control sequence buffer array and said channels for transferring channel identity and control information of successive requests furnished by said channels to successive spaces in said control sequence buffer array, and for transferring other information of said requests into segment spaces in said data buffer array designated by the channel identity information of the respective request;

second means associated with said arrays for transferring said other information of said successive requests together with said associated channel identity information from said arrays to said storage access subsystem, in the sequence of reception of said information from said channels;

third means for receiving responses from said storage access subsystem, in sequential association with the requests transferred by said second means, and for entering said responses into segment spaces in said data buffer array designated by channel identity information retained in the control sequence buffer array in association with the respective requests;

each said response including channel identity information which should correspond to the retained channel identity information in the absence of faulty operation; and fourth means associated with said arrays rendered operative after a said response has been placed into said data buffer array for conditioning said input/output subsystem to be able to initiate transfer of said response from said buffer array to the channel which originated the associated request; the order of transfer among channels being independent of the order of reception of requests.

5. An adapter according to claim 4, wherein said third means includes means for comparing the channel identity information included in each said response with the associated channel identity information retained in said control sequence buffer array in the course of operation of said third means; said comparison being useful to distinguish faulty operation.

6. An adapter in accordance with claim 4 including means for indicating active requests having responses due to be received by said adapter; and hangup timing means for determining instances in which a response to any active request is overdue; said hangup timing means operating independently of said arrays and said first, second, third and fourth means; whereby failure of said timing means does not affect the operability of said adapter in respect to transfer processing of said requests and responses and conversely whereby failure of the operability of the said adapter in transfer processing of said requests and responses does not affect the operability of the hangup timing means.

* * * * *